(12) United States Patent
Mantzouratos et al.

(10) Patent No.: US 11,138,200 B1
(45) Date of Patent: Oct. 5, 2021

(54) EFFICIENT AGGREGATION OF TIME SERIES DATA

(71) Applicant: Tubular Labs, Inc., Mountain View, CA (US)

(72) Inventors: Ioannis Mantzouratos, San Francisco, CA (US); Scott Strickland, Redwood City, CA (US); Dmytro Popovych, Kiev (UA)

(73) Assignee: Tubular Labs, Inc., Mountain View, CA (US)

( * ) Notice: Subject to any disclaimer, the term of this patent is extended or adjusted under 35 U.S.C. 154(b) by 0 days.

(21) Appl. No.: 16/703,006

(22) Filed: Dec. 4, 2019

(51) Int. Cl.
    *G06F 16/2455*    (2019.01)
    *G06F 16/2458*    (2019.01)
    *G06F 16/248*     (2019.01)
    *G06F 16/93*      (2019.01)

(52) U.S. Cl.
CPC ...... *G06F 16/24556* (2019.01); *G06F 16/248* (2019.01); *G06F 16/2477* (2019.01); *G06F 16/24561* (2019.01); *G06F 16/93* (2019.01)

(58) Field of Classification Search
CPC ............... G06F 16/24556; G06F 16/93; G06F 16/24561; G06F 16/2477; G06F 16/248
USPC ........................................................ 707/721
See application file for complete search history.

(56) References Cited

U.S. PATENT DOCUMENTS

| 9,977,805 | B1* | 5/2018 | Bowman | G06F 7/02 |
| 2005/0174235 | A1* | 8/2005 | Davis | G08B 21/0269 |
| | | | | 340/539.13 |
| 2012/0330931 | A1* | 12/2012 | Nakano | G06F 16/2474 |
| | | | | 707/722 |
| 2014/0149444 | A1* | 5/2014 | Pompey | G06F 16/2455 |
| | | | | 707/760 |
| 2020/0089784 | A1* | 3/2020 | Li | G06F 16/1744 |

OTHER PUBLICATIONS

Lemire et al., Decoding Billions of Integers Per Second Through Vectorization, May 15, 2014.

* cited by examiner

*Primary Examiner* — Joshua Bullock
(74) *Attorney, Agent, or Firm* — Van Pelt, Yi & James LLP

(57) ABSTRACT

Efficient aggregation of time series data is disclosed, including: obtaining a first entry value corresponding to an item, wherein the first entry value comprises a first recorded data point that is associated with a first time interval; generating a compressed block based at least in part on compressing the first entry value with at least a second entry value; storing the compressed block in a document corresponding to the item; determining that the item matches an aggregation search query; decompressing the compressed block from the document corresponding to the item to obtain the first entry value and the second entry value; and generating an aggregation result in response to the aggregation search query based on at least a portion of the first entry value and the second entry value.

21 Claims, 18 Drawing Sheets

| 902 | | | | | | | |
|---|---|---|---|---|---|---|---|
| 765 | 524 | 12 | 0 | 0 | 0 | 0 | 0 |
| T3 | T2 | T1 | | | | | |

| 904 | | | | | | | |
|---|---|---|---|---|---|---|---|
| 456 | 985 | 56 | 567 | 641 | 4 | 32 | 231 |
| T11 | T10 | T9 | T8 | T7 | T6 | T5 | T4 |

Item A   | 453 | 86 | 23 | 7 | 897 | 361 | 562 |
          T7    T6   T5   T4   T3    T2    T1

1204

Item B   | 65 | 645 | 13 | 40 | 72 | 45 | 56 |
          T7    T6    T5   T4   T3   T2   T1

1206

Item C   | 4 | 54 | 32 | 456 | 786 | 54 | 36 |
          T7   T6   T5   T4    T3    T2   T1

EFFICIENT AGGREGATION OF TIME SERIES DATA

BACKGROUND OF THE INVENTION

Aggregation of large time series data sets is typically computationally expensive to perform, and thus prohibitive to do in real-time in response to user submitted search queries. As such, a conventional approach is to selectively pre-compute the results of these aggregations offline (e.g., overnight) based on historical and/or saved search queries, expecting that the queries will be performed again in the future. However, such an approach often yields far from ideal performance in practice. A common issue is that users might only retrieve a fraction of the pre-computed results before the latter becomes stale, leading to a lot of wasted computation. Another common issue is that users are not able to get results for queries that did not match the pre-selected set of queries and they have to wait at least until the next iteration of the offline process is completed.

BRIEF DESCRIPTION OF THE DRAWINGS

Various embodiments of the invention are disclosed in the following detailed description and the accompanying drawings.

FIG. 9 is a diagram showing examples of two groups of data points corresponding to an item.

FIG. 12 is a diagram showing an example of item-specific data structures of data points corresponding to three different items.

FIG. 16 is a diagram showing an example of a user interface for receiving a search query.

DETAILED DESCRIPTION

Figure 1:
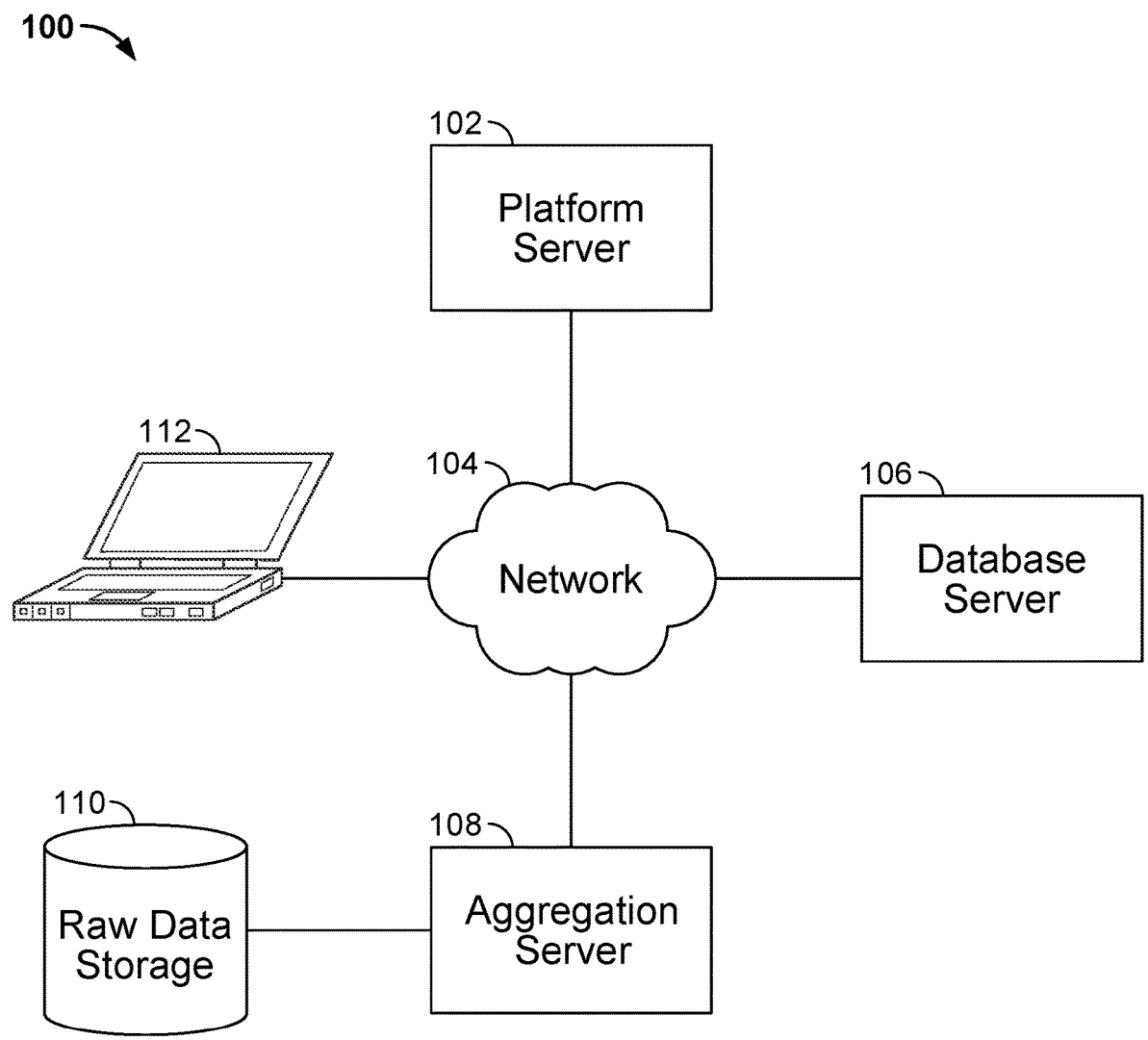
FIG. 1 is a diagram showing an embodiment of a system for performing efficient aggregation of time series data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of efficient aggregation of time series data are described herein. A first entry value corresponding to an item is obtained. The first entry value is a first recorded data point that is associated with a first interval of time. In various embodiments, the recorded data points are observed or derived metrics (e.g., number of subscribers or viewers) related to an item such as a video that is available to stream at an online media platform. For example, an interval of time is a length of time over which the corresponding recorded data point (e.g., metric) was determined. In a specific example, an interval of time is a day (e.g., 24 hours). A compressed block is generated based at least in part on compressing the first recorded data point with at least a second entry value. The second entry value may be either a second recorded data point corresponding to the item that is associated with a second interval of time or a padded data point. For example, recorded data points are grouped together based on a predetermined number of data points and each data point in a group is compressed to save space on the storage of such values. In various embodiments, consecutive data points are associated with consecutive, equally spaced points in time. In various embodiments, if fewer than the predetermined number of recorded data points is available to form a group, then padded data points are added until the group includes the predetermined number of entries that include a combination of recorded data point(s) and padded data point(s). In some embodiments, a padded data point is a zero or another configured value. The compressed block is stored in a document corresponding to the item. In various embodiments, a "document" comprises a record or a plurality of fields that stores information corresponding to an item. For example, a "document" is a JSON file, an XML file, or a binary file. For example, the document stores various metadata associated with the item (e.g., a video). It is determined that the item matches an aggregation search query. The compressed block from the document corresponding to the item is decompressed, along with zero or more other compressed blocks, to obtain the first recorded data point and the second recorded data point or the padded data point. An aggregation result is generated in response to the aggregation search query based on at least a portion of the first recorded data point and the second recorded data point or the padded data point.

FIG. 1 is a diagram showing an embodiment of a system for performing efficient aggregation of time series data. In the example of FIG. 1, system 100 includes platform server 102, network 104, database server 106, aggregation server 108, raw data storage 110, and client device 112. Network 104 may be implemented using high-speed data and/or telecommunications networks. Platform server 102, database server 106, aggregation server 108, and client device 112 communicate to each other over network 104.

Platform server 102 is configured to track and store metadata corresponding to items that are available at its platform (e.g., an online video hosting platform). For example, the platform comprises an online video hosting platform and as such, platform server 102 is configured to store (e.g., static) metadata such as, for example, the title, the uploading user, and the upload date of each video. In the example of the platform comprising an online video hosting platform, platform server 102 is also configured to capture time series data such as metrics that are associated with each video on each interval of time (e.g., day). One example type of time series metric metadata is a time series of metadata with respect to a video or a channel that includes one or more videos. Examples of time series metadata with respect to each video of each channel of videos include, for each interval of time (e.g., each day), the number of views, the number of likes, the number of comments, the number of engagements, and the number of followers/subscribers.

Aggregation server 108 is configured to collect raw metadata associated with items from platform servers such as platform server 102. For example, aggregation server 108 is configured to collect raw metadata associated with items from platform servers for the purpose of generating analytics with respect to user engagement with the items. Aggregation server 108 is configured to store the collected raw metadata in raw data storage 110. While raw data storage 110 is shown to be local to aggregation server 108 in system 100 in FIG. 1, in another example, raw data storage 110 may be a remote storage repository that is operated by a third party service (e.g., Amazon S3). In some embodiments, aggregation server 108 is configured to obtain raw metadata from platform servers such as platform server 102 periodically and/or in response to a detected event. In some embodiments, aggregation server 108 is configured to obtain metadata from platform servers such as platform server 102 via an application program interface (API) that is provided by the platform server and/or through other techniques. In some embodiments, aggregation server 108 is configured to preprocess data collected from platform servers such as platform server 102 to eliminate noise, correct for potential abnormal data, and/or interpolate data. In some embodiments, raw time series data comprises data points with respective time interval designations (e.g., timestamps). For example, the number of total views of a video would be a number as well as the corresponding date at which that total number was determined.

In various embodiments, aggregation server 108 is configured to store metadata associated with each item collected from platform servers in corresponding one or more document(s). For example, an item-specific document stores static information corresponding to the item such as, for example, the title, the uploading user, and the upload date of each item. In various embodiments, aggregation server 108 is configured to sort the time series recorded data points corresponding to an item by the reverse chronological order of their respective time intervals (e.g., timestamps), divide the metadata into groups, compress the data points within each group into a compressed block (e.g., in binary form), and then store the compressed blocks in a document corresponding to the item. In various embodiments, the time interval corresponding to each recorded data point is of a fixed length of time (e.g., 24 hours). In various embodiments, consecutive/adjacent recorded data points correspond to consecutive time intervals. By dividing the time series data into groups and compressing each group, the time series data can be stored more efficiently and also read more efficiently, as will be described in further detail below. Furthermore, unlike some conventional techniques of storing time series data that generates, for an item and/or a set of static metadata, a new/different document for the recorded data point corresponding to each new/different timestamp, various embodiments describe storing multiple data points corresponding to multiple time intervals for one item in a single item-specific document. By organizing and updating an item-specific document with recorded data points corresponding to multiple time intervals as described herein, the storage space needed to store time series data is greatly reduced over such conventional techniques.

In various embodiments, item-specific documents are stored by aggregation server 108 at database server 106. In various embodiments, database server 106 comprises a database that indexes and stores documents, such as item-specific documents, for fast retrieval. For example, database server 106 runs Elasticsearch. In some embodiments, at least some item-specific documents are also stored at aggregation server 108.

Aggregation server 108 provides a user interface for receiving a search query for matching item metadata. In some embodiments, the user interface is exposed to a user via an application or a website. For example, a user may access such a user interface via client device 112. The user interface may comprise fields and/or selections for criteria of metadata related to specified items. In some embodiments, a search query may specify criteria for aggregating time series data associated with specified items. In response to receiving a search query, in some embodiments, aggregation server 108 is configured to query database server 106 for documents that match the search query and generate a search result based on the contents of the matching documents. In some embodiments, aggregation server 108 sends to database server 106 custom computer code (e.g., a software plug-in) that, when executed, is configured to cause database server 106 to perform one or more of the following functions: update documents based on new time series data, locate the matching documents to a search query that is sent from aggregation server 108, and perform aggregation computations based on the matching documents in response to the search query. Regardless of where the aggregation computations are performed (e.g., at either aggregation server 108 or database server 106) or where item-specific documents are stored (e.g., at either aggregation server 108 or database server 106), matching documents to a search query are obtained from a document storage source and a search (e.g., aggregation) result is generated based on such matching documents. In some embodiments, where the search query specifies aggregation over time intervals (e.g., timestamps) across one or more items for which documents are stored at a document storage source (e.g., at either aggregation server 108 or database server 106), each matching document that matches the search query is found and one or more compressed blocks of time series data are decompressed to read the data points and compute the aggregation result. In some embodiments, the aggregation computations for a search query are performed local to the location at which the matching item-specific document(s) are found so that the computations can be performed faster (i.e., data associated with the found matching documents does not need to be transmitted over network 104 to a different entity for that entity to perform the aggregation computations). In one example, aggregation server 108 has sent computer code (e.g., a software plug-in) to database server 106, which is configured to store item-specific documents. When executed by a processor, the computer code is configured to, at least, locate the matching documents to a search query that is sent from aggregation server 108, and perform aggregation computations based on the matching documents in response to the search query. After aggregation server 108 receives a search query from client device 112, aggregation server 108 is configured to send the search query to database server 106, which is configured to execute the previously received computer code to locate the matching documents to that search query and perform aggregation computations based on the matching documents.

For example, a search query may request a total number of views for each day in the last seven days across items (e.g., videos) that match the term "pair figure skating." As will be described in further detail below, given that time series data points are sorted in reverse chronological order and usually, the more recent data points are queried, fewer than all of the compressed blocks in a matching document may be decompressed. As such, a time series set of information may be quickly obtained for the matching document, which significantly improves the efficiency of aggregating such data across multiple matching items (e.g., videos) and such aggregation of matching data can be performed quickly, in real-time.

Aggregation server 108 is configured to generate a visualization of the search results generated in response to a search query. For example, in response to a search query for an aggregation of time series data, aggregation server 108 is configured to generate a plot or a graph that represents a corresponding aggregation at each time interval within the time period/window that is specified by the search query. If the search query had been received from client device 112, aggregation server 108 is configured to send the visualization of the search results to client device 112 so that the visualization can be presented at a user interface that is presented at client device 112.

Figure 2:
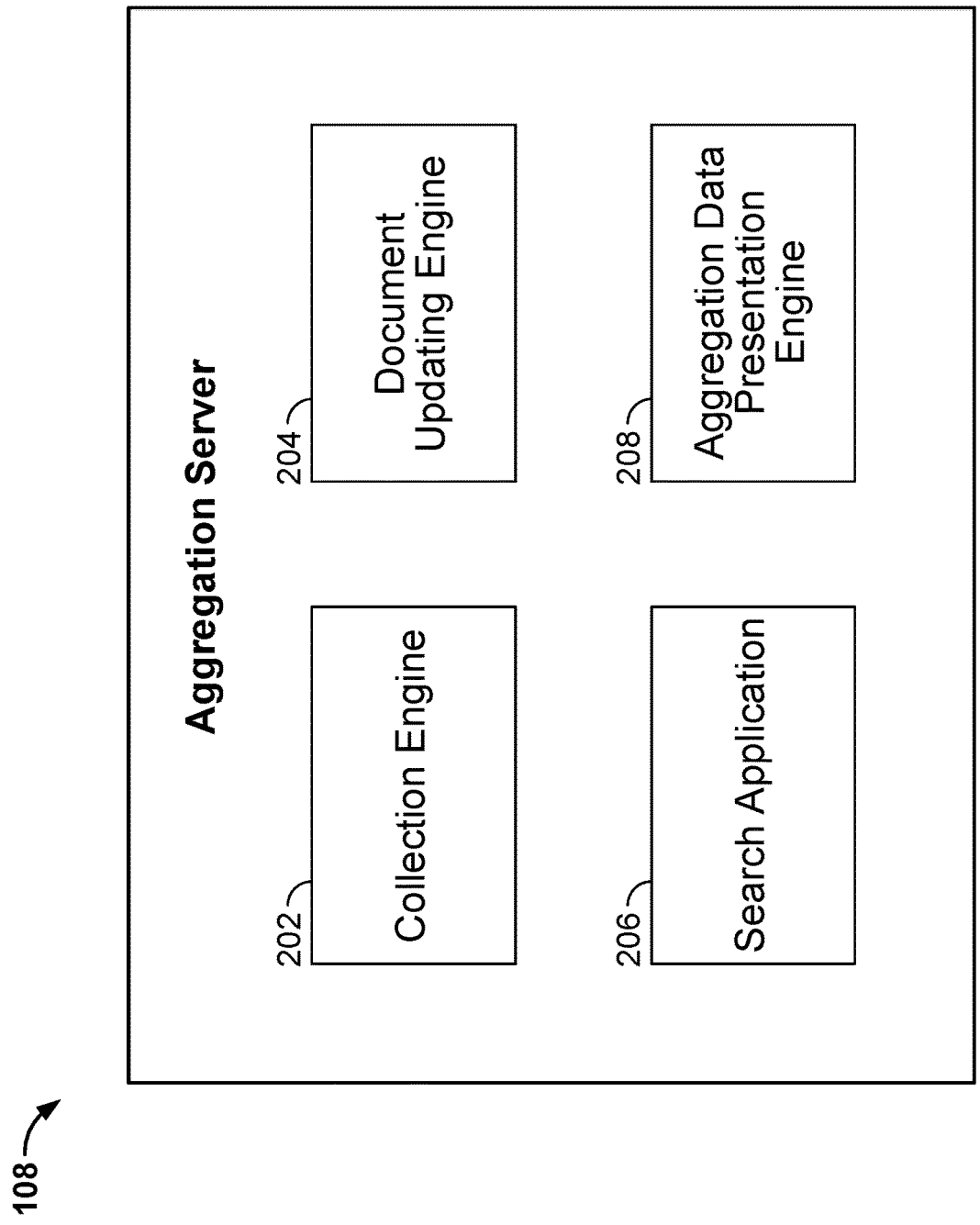
FIG. 2 is a diagram showing an example of an aggregation server.

FIG. 2 is a diagram showing an example of an aggregation server. In some embodiments, aggregation server 108 of system 100 of FIG. 1 may be implemented using the example of FIG. 2. In FIG. 2, the example aggregation server includes collection engine 202, document updating engine 204, search application 206, and aggregation data presentation engine 208.

Collection engine 202 is configured to collect raw metadata associated with items from one or more platform servers. In some embodiments, collection engine 202 is configured to obtain metadata associated with the items from one or more platform servers on a periodic basis (e.g., once a day) and/or in response to detected events. In some embodiments, collection engine 202 is configured to collect only new and/or metadata associated with an item relative to the previous time that it collected metadata associated with that item. In some embodiments, collection engine 202 is configured to only collect metadata associated with select items that match a set of collection criteria (e.g., items that had been uploaded or otherwise made available at a platform server within a predetermined period of time, items that are associated with trending tags, etc.). In some embodiments, collected time series data comprises data points with respective time intervals. For example, a time interval comprises a timestamp and/or an identification of a date. As mentioned above, in various embodiments, the time interval corresponding to each data point is of a fixed length of time (e.g., 24 hours). As mentioned above, in various embodiments, consecutive/adjacent data points correspond to consecutive time intervals. For example, if the item were a video and the collected metadata were the number of comments on the video, then the collected data may include a total number of comments that had been made with respect to the video at the platform server that is hosting the video corresponding to each day. Collection engine 202 is configured to store the collected raw metadata at a raw data storage that may or may not be local to the aggregation server.

In some embodiments, document updating engine 204 is configured to preprocess the collected raw metadata prior to storing it at a raw data storage. Examples of preprocessing may include one or more of the following: denoising (e.g., removing abnormal data points), interpolating to estimate data points corresponding to missing time intervals, and extrapolating future data points based on historical data points. Document updating engine 204 is configured to analyze the collected raw metadata associated with items and update the item-specific documents based on the analyzed collected raw metadata. Document updating engine 204 is configured to periodically analyze the collected raw metadata that is stored at a raw data storage to update the item-specific documents associated with various items, where the item-specific documents are stored at a database server which has indexed the documents for efficient searching. Document updating engine 204 is configured to identify new and/or changed static metadata corresponding to an item and update the item-specific document(s) corresponding to the item by, for example, sending the updated static metadata to the database server. Document updating engine 204 is configured to identify new time series data corresponding to an item and then update the corresponding item-specific document(s) accordingly. Specifically, in some embodiments, document updating engine 204 is first configured to obtain, from a database server, a document corresponding to an item for which new raw time series data has been collected. Based on the time series data that is already stored in the compressed block(s), if any, within the obtained content, document updating engine 204 is configured to decompress all of the stored compressed block(s) of the document and generate one or more new compressed blocks by combining the data points of the decompressed block(s) with the new data points, which have been ordered based on reverse chronological order, to generate one or more new compressed block(s) corresponding to the item.

Search application 206 is configured to obtain a search query for aggregating data associated with one or more items. In some embodiments, the search query is obtained from a user interface. For example, if the items comprise videos, the search query may include video attributes (e.g., keywords, names of channels), the number of views that the video has, one or more platforms at which the videos are hosted, the language(s) that are associated with the video, the length of the video, and a time period/window over which the aggregation is to be performed. Search application 206 is configured to determine one or more matching item documents that match at least a portion of a search query (e.g., the video attributes, the number of views that the video has, one or more platforms at which the videos are hosted, the language(s) that are associated with the video, when the video had been uploaded, the length of the video). For example, a matching document comprises a document whose static metadata (e.g., video name, video publisher) matches that of a search query. To generate the aggregation result for a search query that requests for an aggregation of time series data, in some embodiments, search application 206 is configured to read at least some of the compressed blocks in each of the matching documents. For example, the time period/window over the aggregation that is to be performed that is specified by the search query is compared against the time intervals that are associated with the data points that are stored within the one or more compressed blocks in each document to determine how many compressed blocks need to be decompressed. Because each compressed block includes only a portion of all the data points that are associated with each item and data points in the compressed blocks are ordered in reverse chronological order (meaning that the last generated compressed block includes the newest data points based on their respective time intervals), in most cases where the queried metadata pertains to a recent time period, far fewer than all of the compressed blocks that are stored within a document need to be read and decompressed in order to locate the data points with respective time intervals that fall within the queried time period of aggregation. As will be described in further detail below, search application 206 is configured to arrange the time series data points related to each item that fall within the queried time period of aggregation into an item-specific data structure. Search application 206 then uses the item-specific data structures to generate the aggregation result corresponding to the search query. At least due to the selective decompression of compressed blocks of time series data points for each item from the item's corresponding document, the identification and retrieval of such data that matches a search query is substantially improved over the conventional technique of retrieving the entire set of time series raw data for each item.

In some embodiments, at least some functions described for search application 206 with respect to aggregating time series data points may be performed by another entity other than search application 206 of the aggregation server. In some instances, such functions may even be performed by another entity outside of the aggregation server, such as by computer code (e.g., a custom plug-in) that is executing at the database server at which the item-specific documents are stored.

Aggregation data presentation engine 208 is configured to obtain the aggregation result from search application 206. In one example, the aggregation result comprises a series of pairs of aggregated data points and respective time intervals. In a second example, the aggregation result comprises pairs of item identifiers and respective aggregated values. Aggregation data presentation engine 208 is configured to generate a visualization based on the aggregation result and cause the visualization to be presented at a user interface. For example, the visualization comprises a plot or a graph that comprises aggregation data points across a time period that was specified by a search query and/or a list of item identifiers that are ranked by their respective aggregated values.

Figure 3:
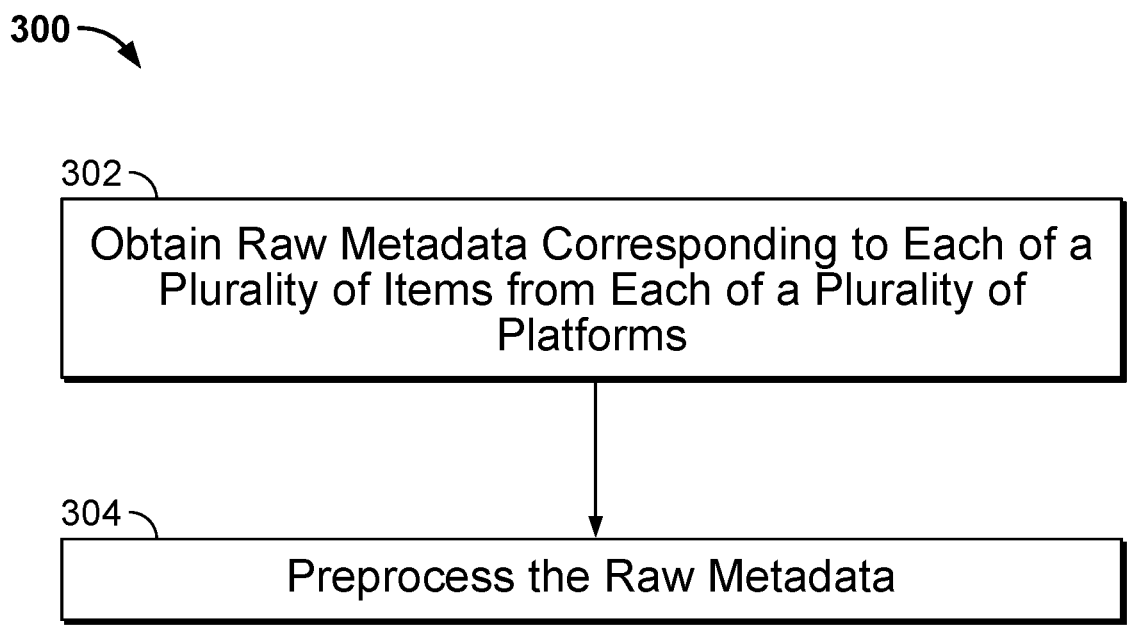
FIG. 3 is a flow diagram showing an embodiment of a process for collecting raw metadata corresponding to items.

FIG. 3 is a flow diagram showing an embodiment of a process for collecting raw metadata corresponding to items. In some embodiments, process 300 is implemented at aggregation server 108 of system 100 of FIG. 1.

In some embodiments, process 300 is performed periodically.

At 302, raw metadata corresponding to each of a plurality of items is obtained from each of a plurality of platforms. New and/or changed metadata associated with an item is obtained from each of multiple platforms at which such items are available. For example, the items are videos and the platforms are online platforms that host such videos. In some embodiments, given the abundance of items that are available at each platform, metadata is only obtained from the platform for each of a select subset of items that are available at that platform. The collected raw metadata comprises static metadata (e.g., metadata values that are not associated with time intervals) and time series data (e.g., where each data point has an associated time interval). For example, time series data comprises the number of views, the number of likes, the number of comments, the number of engagements, and the number of followers/subscribers corresponding to each day.

At 304, the raw metadata is preprocessed. As described above, the collected raw metadata can be preprocessed, for example, by removing suspected erroneous data points and replacing the removed or otherwise missing data with interpolated data points.

Figure 4:
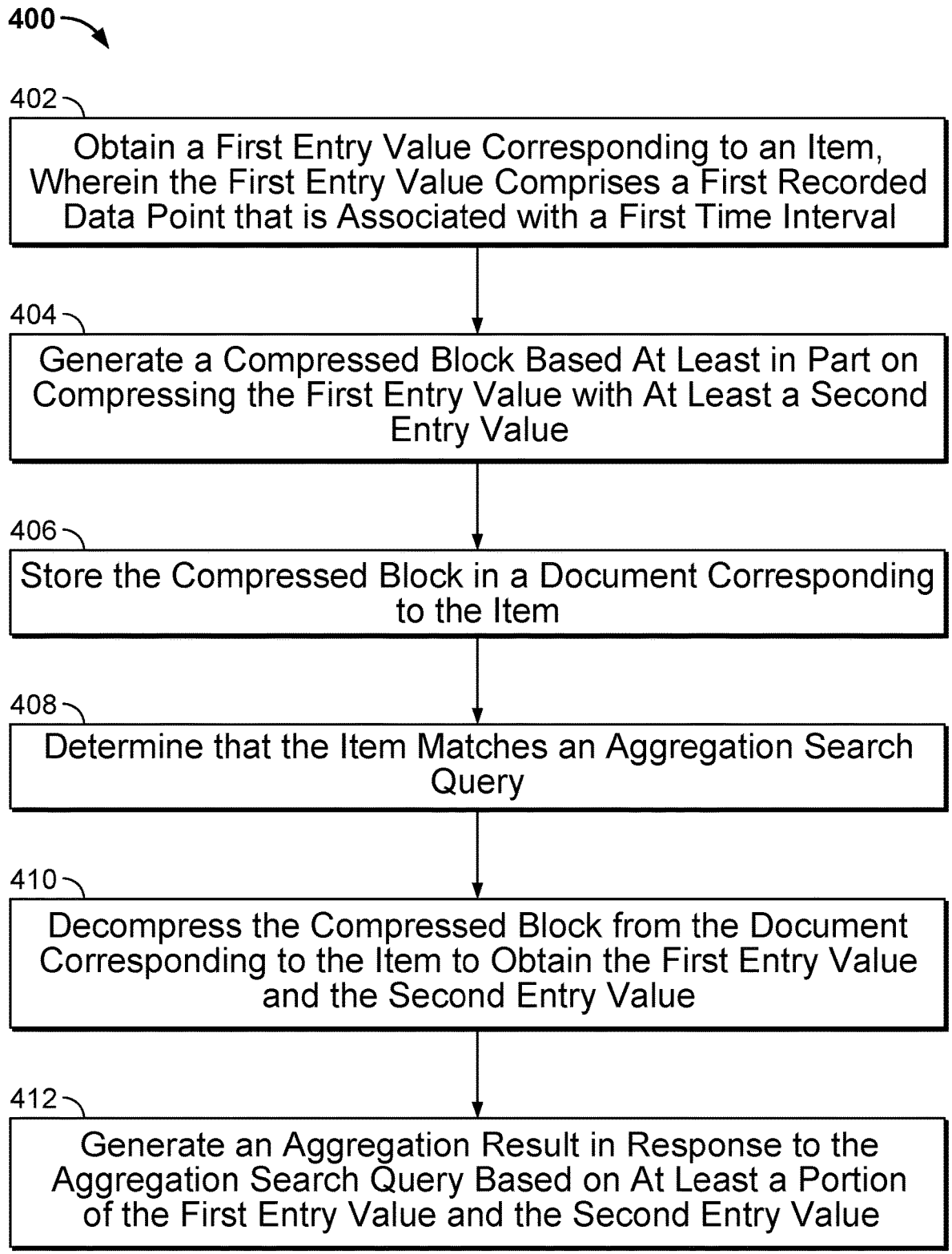
FIG. 4 is a flow diagram showing an embodiment of a process for performing efficient aggregation of time series data.

FIG. 4 is a flow diagram showing an embodiment of a process for performing efficient aggregation of time series data. In some embodiments, process 400 is implemented at aggregation server 108 of system 100 of FIG. 1. In some embodiments, process 400 is implemented at database server 106 of system 100 of FIG. 1.

At 402, a first entry value corresponding to an item is obtained, wherein the first entry value comprises a first recorded data point that is associated with a first time interval. For example, the first recorded data point comprises a particular type of statistical value/metric associated with the item and associated with a particular time interval. For example, the first recorded data point comprises a change (e.g., increase) in the total number of views of an item (e.g., a video) on Jun. 2, 2019 relative to the total number of views on the previous day, Jun. 1, 2019. In various embodiments, the first "recorded" data point is either an observed data point (e.g., a data point that is obtained from a platform at which the item is available) or it is a derived data point that is derived from one or more other observed data points (e.g. using an interpolation technique) (e.g., if an observed data point associated with the first time interval was not able to be collected from the platform but can otherwise be derived).

At 404, a compressed block is generated based at least in part on compressing the first entry value with at least a second entry value. As mentioned above, data points corresponding to respective time intervals are grouped into groups of a predetermined number of entry values (N) and each group is compressed into a compressed block. A compressed block can be formed from a group that includes as few as one recorded data point. If a group includes at least one recorded data point but fewer than N recorded data points, then padded data points (e.g., zeroes) are added to the group so that the combined number of entry values in the group, where each entry value comprises a recorded data point or a padded data point, equals N. As mentioned above, in some embodiments, where a recorded data point is unavailable for a corresponding time interval (e.g., a time interval for which the item, such as a video, had not been made publicly available yet), a padded data point (e.g., a zero) is used as a placeholder for that time interval in a group of entries. Then, the group of data point(s) and padded data point(s), if any, are compressed into a compressed block. As such, the second entry value that is compressed with the first data point of the first entry value may be either a second recorded data point or a padded data point.

For example, if the second entry value were the second recorded data point, then the second recorded data point would comprise the same type of statistical value/metric as the first recorded data point and would be associated with a particular time interval that is different from but consecutive/adjacent to and of the same length as the time interval that is associated with the first recorded data point. As mentioned above, in various embodiments, the time interval corresponding to each data point is of a fixed length of time (e.g., 24 hours). As mentioned above, in various embodiments, consecutive/adjacent data points correspond to consecutive time intervals. For example, the second recorded data point comprises a change (e.g., increase) in the total number of views of an item (e.g., a video) on Jun. 1, 2019 relative to the total number of views on the previous day, May 31, 2019. The first recorded data point and the second recorded data point are sorted by reverse chronological order according to their respective time intervals and grouped together along with one or more other recorded data points (or padded data points if recorded data points are unavailable) corresponding to respective other time intervals to form a predetermined number of entry values (N), where an entry value is either a recorded data point or a padded data point.

For example, N is a user configured positive integer. For example, N can be selected to be a number of data points that is predicted to be a common unit of data points that is requested by a user for performing aggregations. For example, the number of entry values, N, can be 30 (recorded data points and/or padded data points). In one example of generating a compressed block, each entry value within a group is compressed by using less than 32 bits that are typically used to store an integer value to represent that value. For example, the number of bits less than 32 that are used to represent each entry value is determined based on the maximum entry value within the group. In one specific example, the number of bits that are used to represent each entry value in a group is written at the beginning of each compressed block and the rest of the compressed block comprises a concatenation of the compressed representations of each entry value in the group. While certain compression techniques are described herein, they are merely examples and any appropriate compression technique may be used to generate compressed blocks of data points and/or padded data points.

At 406, the compressed block is stored in a document corresponding to the item. In some embodiments, the compressed block is stored with zero or more other compressed blocks in the document corresponding to the item. Because information that identifies the time interval that corresponds to each data point is not stored with the data points to conserve storage space, lightweight information can be stored in the item-specific document to enable the inference of the corresponding time interval for each data point included in the compressed blocks when the compressed blocks are read. For example, such lightweight information includes: the time interval corresponding to the most recent recorded data point in the compressed block(s) and/or the number of total recorded data points (non-padded data points) that are included in the compressed block(s).

At 408, it is determined that the item matches an aggregation search query. In various embodiments, it is determined that the item matches an aggregation search query by determining a match between information stored in the item's corresponding document and at least a portion of the aggregation search query. The aggregation search query may include information that matches multiple items. The aggregation search query also specifies which type of aggregation is to be performed based on the information stored in each matching item's corresponding document.

At 410, the compressed block from the document corresponding to the item is decompressed to obtain the first entry value and the second entry value. To generate an aggregation that is across one or more time intervals, at least one compressed block from the matching item's document is read and decompressed to obtain the data points included therein.

At 412, an aggregation result is generated in response to the aggregation search query based at least in part on the first entry value and the second entry value. The time intervals corresponding to the obtained data points of the decompressed blocks are inferred based on the other information stored in the document (e.g., number of data points (non-padded data points) that are included across the compressed blocks and also the most recent time interval that is associated with a recorded data point in the compressed blocks) to determine a time series aggregation using the data points to satisfy the request. For example, depending on the type of aggregation that is specified by the aggregation search query, data points corresponding to different time intervals associated with the same item may be aggregated (e.g., summed together). In another example, depending on the type of aggregation that is specified by the aggregation search query, data points corresponding to the same time intervals associated with the different items that match the aggregation search query may be aggregated (e.g., summed together).

Figure 5:
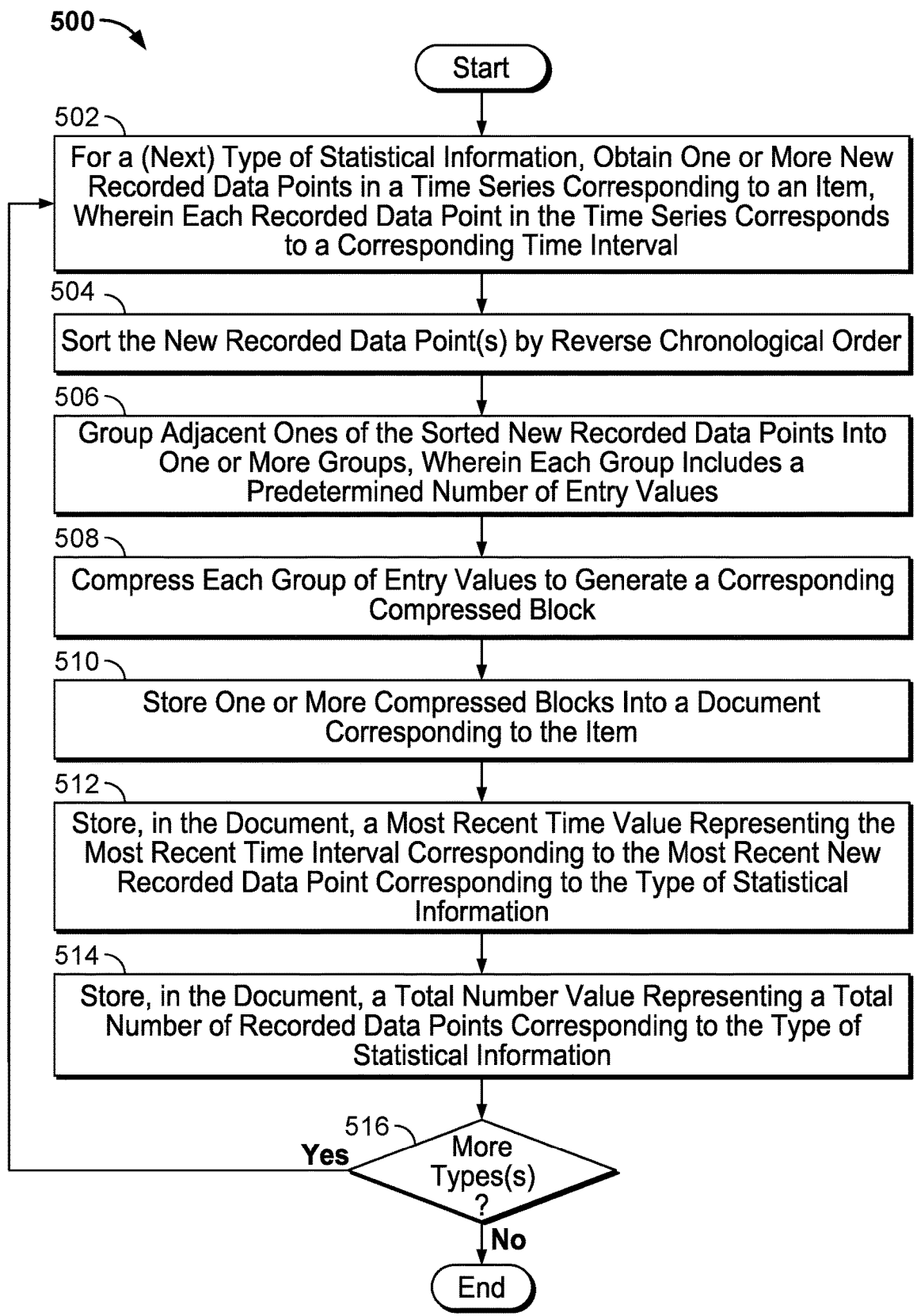
FIG. 5 is a flow diagram showing an example of a process for generating compressed blocks for time series data related to trends for a particular item.

FIG. 5 is a flow diagram showing an example of a process for generating compressed blocks for time series data related to trends for a particular item. In some embodiments, process 500 is implemented at aggregation server 108 of system 100 of FIG. 1. In some embodiments, process 500 is implemented at database server 106 of system 100 of FIG. 1. In some embodiments, steps 402, 404, and 406 of process 400 of FIG. 4 may be implemented, at least in part, using process 500.

In the example of process 500, the particular type of time series data that is collected for an item relates to a particular type of statistical information. Taking the example of an item being a video, different types of statistical information include, for example but not limited to: the number of views, the number of likes, the number of comments, the number of engagements, and the number of followers/subscribers. For example, each time that metadata is collected for a video (e.g., using a process such as process 300 of FIG. 3), new recorded data points may be obtained from the platform on which the video is hosted for each of one or more of the statistical information types including: the number of views, the number of likes, the number of comments, the number of engagements, and/or the number of followers/subscribers related to the video.

At 502, for a (next) type of statistical information, one or more new recorded data points in a time series corresponding to an item are obtained, wherein each recorded data point in the time series corresponds to a corresponding time interval. Process 500 describes an example process in which compressed blocks are separately generated for each different type of statistical information that is associated with an item.

In various embodiments, new data points comprise new "recorded" data points, which include either observed data points, which are directly collected from a source platform, or derived data points, which are derived from other observed data points. For example, derived data points may include data points that are interpolated from other (e.g., neighboring) observed data points. In a specific example, new recorded data points with respective time intervals corresponding to the type of statistical information of the number of views for the item comprising a video include (number of views, date in the yyyy-mm-dd format): (543, 2019-06-05), (2341, 2019-06-06), and (7865, 2019-06-07).

At 504, the new recorded data point(s) are sorted by reverse chronological order. The new recorded data points are ordered from the most recent to the least recent. Taking the specific example described above, the new recorded data points corresponding to the type of statistical information of the number of views for the item comprising a video are sorted from 7865, 2341, and 543.

At 506, adjacent ones of the sorted new recorded data points are grouped into one or more groups, wherein each group includes a predetermined number of entry values. As will be described below with the example of process 600 of FIG. 6, if the document corresponding to the item had already included existing compressed block(s), then the existing compressed block(s) may all be decompressed so that the new recorded data points and the existing recorded data points are ordered in reverse chronological order and then grouped into groups of predetermined number N data points. If there are less than N (e.g., 30) new and existing recorded data points in a group, padded data points are padded to the group to fill out the 30 entry values. For example, each padded data point is zero or another user configurable value. In some embodiments, the padded data points (e.g., zeros) are added to the group with recorded data points corresponding to the oldest/least recent time intervals and in positions that are associated with older/less recent time intervals than the last recorded data point in the group.

At 508, each group of entry values is compressed to generate a corresponding compressed block. Each recorded data point and/or padded data point of a group is itself compressed to form the compressed block corresponding to the group. In some embodiments, each recorded data point or padded data point within a group is an integer, which is typically represented by 32 bits. One example type of compression that can be performed includes first determining the maximum number of bits (up to 32 bits) that needs to be used to represent the largest data point within a group of N (e.g., 30) entries. For example, if the largest recorded data point among 30 data points and/or padded data points can be represented using only 10 bits, then each data point within that group of 30 recorded data points and/or padded data points is compressed by converting the same value to a 10-bit representation, which is a significant space reduction from using 32 bits to represent each entry value in the group of 30. The number of bits (10 bits, in this specific example) is then written to the beginning (e.g., within the first five bits) of each compressed block so that the data points of the compressed block can be later determined to correctly decompress the values in the compressed block.

In various embodiments, to reduce the storage space that is needed to store time series data, each recorded data point is denoted as a delta/incremental/changed value relative to the immediately previous recorded data point. Put another way, if time interval T1 is the time interval immediately after time interval T2, then recorded data point A at time interval T1 is determined relative to recorded data point B at time interval T2. Given the delta representation of data points at adjacent time intervals, certain recorded data points may be negative. For example, if the type of statistical information were the number of subscribers to the item of a video or a channel of one or more videos, then from one time interval (e.g., day) to the next, the number of subscribers of the video could drop and so there could be negative recorded data points collected for this type of statistical information. However, using the example compression technique described above, a negative integer cannot be compressed to use less than the 32 bits that are typically used to represent an integer. Therefore, in some embodiments, prior to compressing the data points and/or padded data points in a group, it is first determined whether there are any negative data points within the group. If at least one negative data point is present, each data point within the group is mapped to a positive value using a predetermined mapping scheme. The following is one example type of mapping scheme:

If K is positive, represent K as 2*|K|, and

If K is negative, represent K as 2*|K|−1

Where K represents each data point of the group.

Note that in general, compared to |K|, one additional bit is needed to represent 2*|K|. For example, the common binary representation for 3 is "11" (2 bits), but the common binary representation for 6 is "110" (3 bits). As such, it is assumed that the data points in this case can be represented by $2^{31}$.

This means that the following mapping assumes that our integers will generally be small enough to fit in 31 bits. Otherwise, it would not be possible to multiply |K| by 2 and still stay within the limit of 32 bits (which is the conventional size of an integer). Additionally, a flag is set with the type of compressed data in the document (e.g., the header thereof and which proceeds compressed blocks in the document) corresponding to the item to indicate that negative data points are present so that during decompression of the compressed block(s) corresponding to that type of trend, each recovered data point can be mapped back to its original negative or positive value.

At 510, one or more compressed blocks are stored into a document corresponding to the item. In some embodiments, the new compressed block(s) can be stored in an item-specific document corresponding to the item with an identifier corresponding to their type of trend and/or in a location within the document that denotes their trend type.

At 512, a most recent time value representing the most recent time interval corresponding to the most recent data point corresponding to the type of trend is stored in the document. A value that represents the time interval (e.g., timestamp such as the date) of the most recent recorded data point of this type of statistical information is stored in the document. For example, this value may be used during decompression of one or more compressed blocks to determine which of the data points within the blocks correspond to which time interval. In some embodiments, given that data points represent consecutive time intervals and also, given that data points are stored in reverse chronological order, the corresponding time interval of each data point can be inferred (and therefore, does not need to be stored with each data point to save storage space).

At 514, a total number value representing a total number of recorded data points corresponding to the type of statistical information is stored in the document. For example, the number of recorded data points corresponding to the type of statistical information may be used to determine whether a compressed block stored in the document includes any padded data points (i.e., fewer than N recorded data points).

During a later decompression of this compressed block (and any other compressed blocks that are to be decompressed), the corresponding time interval corresponding to each recorded data point of the blocks can be determined as follows: If the most recent time of the most recent data point is T (which corresponds to the time interval of the first recorded data point of the first/most recently generated compressed block), given that each block is of a fixed size N, and that each data point corresponds to consecutive time intervals of fixed length, the following can be determined: the first recorded data point of the second block corresponds to time T−N, the third data point of the fourth block corresponds to time T−3*N−2, etc.

Similarly, as could be determined during a later decompression of the decompressed blocks, if the total number of recorded (i.e., non-padded) data points in the compressed blocks is V, given that each block is of a fixed size N, and that only the very last compressed block is with padded data points, if any, how many padded data points there are in the block(s) can be determined as a function of the quotient of V/N (e.g., if there are 50 recorded data points and N=30, there are 30*2−50=10 padded data points at the final/earliest generated block).

At 516, it is determined whether there are new recorded data point(s) for at least one more type of statistical information corresponding to the item. In the event that there are new recorded data point(s) for at least one more type of trend corresponding to the item, control is returned to 502 to repeat process 500 for the next type of statistical information. Otherwise, in the event that there are no new recorded data points for any other type of trend corresponding to the item, process 500 ends.

Figure 6:
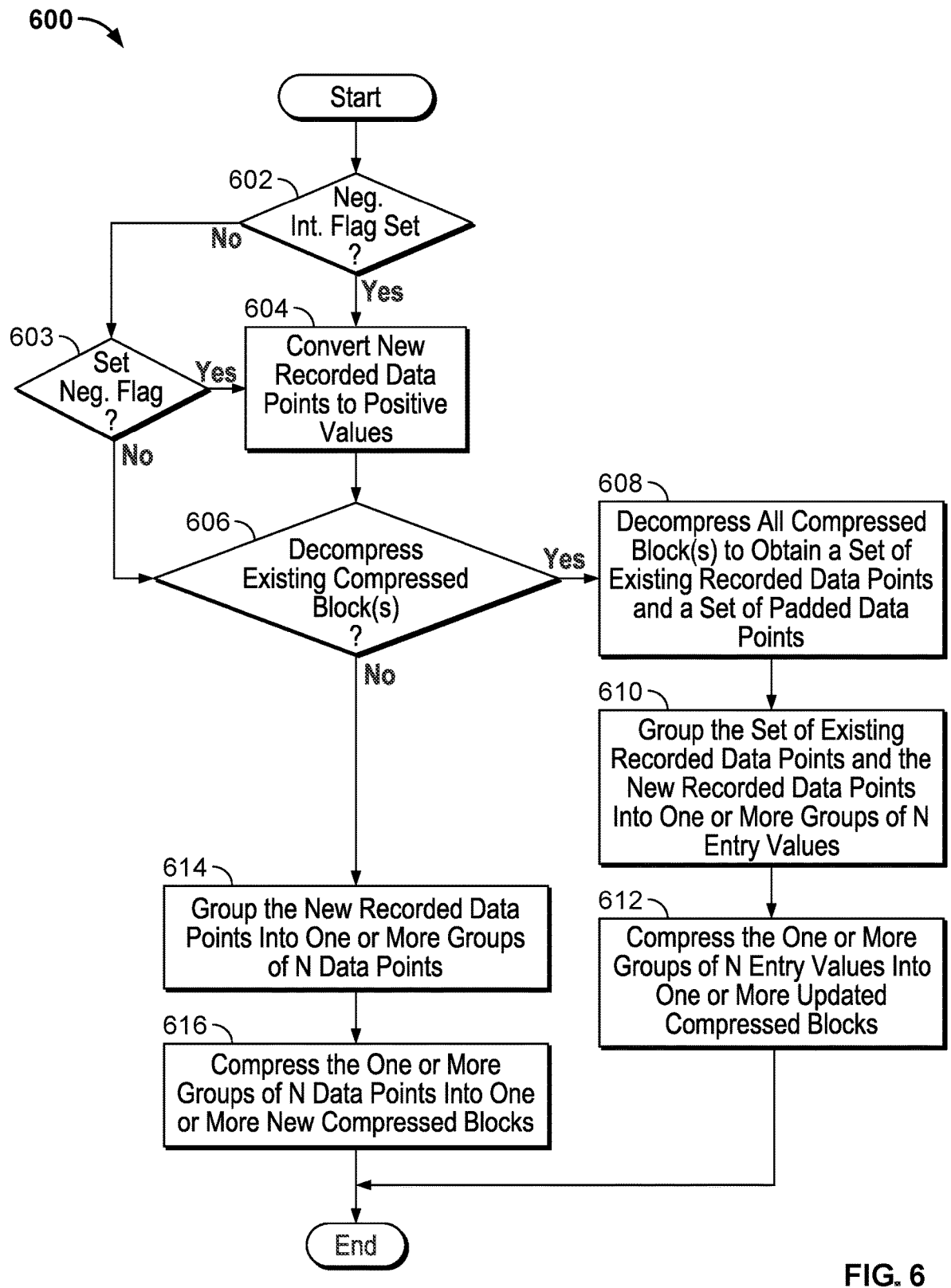
FIG. 6 is a flow diagram showing an example of a process for generating compressed blocks for a particular item.

FIG. 6 is a flow diagram showing an example of a process for generating compressed blocks for a particular item. In some embodiments, process 600 is implemented at aggregation server 108 of system 100 of FIG. 1. In some embodiments, process 600 is implemented at database server 106 of system 100 of FIG. 1. In some embodiments, steps 506 and 508 of process 500 of FIG. 5 may be implemented, at least in part, using process 600.

Process 600 describes an example process of generating compressed blocks for a particular item in response to new recorded data points being available for the item. In the example of process 600, if the one or more padded data points are needed to be added to a group of data points to form a predetermined number N of entry values, then the padded data points are added to the group of data points that are associated with the oldest time intervals. Because compressed blocks corresponding to more recent time intervals are more often read (e.g., in response to an aggregation search query) than compressed blocks corresponding to less recent time intervals, it is advantageous to ensure that more recorded data points are included in the compressed blocks corresponding to more recent time intervals.

At 602, it is determined whether a negative integers flag has already been set for the item. In the event that it is determined that the negative integers flag has already been set for the item, meaning that there has been at least one negative value among the existing recorded data points stored for that item, control is transferred to 604. Otherwise, in the event that it is determined that the negative integers flag has not already been set for the item, meaning that there have not been any negative values among the existing recorded data points stored for that item, control is transferred to 603.

At 603, it is determined whether any of the new recorded data points associated with the item are negative. In the event that the new recorded data points include at least one negative value, control is transferred to 604. Also, if the new recorded data points include at least one negative value, the negative integers flag is then set for the item. Otherwise, in the event that the new recorded data points do not include any negative values, control is transferred to 606. Also, if the new recorded data points do not include any negative values, the negative integers flag remains not set for the item.

At 604, new recorded data points are converted into positive values. As mentioned above, in some embodiments, if the negative integers flag has already been set for the item and/or at least one new recorded data point is a negative value (integer), then each new recorded data point is converted into a positive value based on a predetermined mapping scheme.

At 606, it is determined whether existing compressed blocks in a document corresponding to the item should be decompressed. In the event that it is determined that the existing compressed blocks in a document corresponding to the item should be decompressed, control is transferred to 608. Otherwise, in the event that it is determined that the existing compressed blocks in a document corresponding to the item should not be decompressed, control is transferred to 614. It is determined whether decompressing all of the existing compressed block(s) in the document corresponding to the item can be avoided. Decompressing all of the existing compressed block(s) in the document corresponding to the item can be avoided if the following condition is met: [the total number of new recorded data points] modulo [the predetermined number of entry values in a group, N] is zero. If the total number of new recorded data points is a multiple of N, then the existing compressed blocks do not need to be decompressed because the new recorded data points can be divided into one or more groups, where each group includes exactly N recorded data points. Otherwise, if the total number of new recorded data points is not a multiple of N, then the existing compressed blocks will need to be decompressed because the new recorded data points cannot be divided into one or more groups, where each group includes exactly N recorded data points.

At 608, all compressed block(s) are decompressed to obtain a set of existing recorded data points and a set of padded data points. Every compressed block in the document is decompressed. In one example, a compressed block can be decompressed by reading the first five bits of the compressed block to determine the number of bits (≤32 bits) that was used to represent each data point or padded data point in the compressed block. Then, the number of bits that was used to represent each data point or padded data point in the compressed block is used to recover each data point or padded data point of the compressed block.

At 610, the set of existing recorded data points and the new recorded data points are grouped into one or more groups of N entry values. The existing recorded data points and new recorded data points are sorted by the reverse chronological order of their corresponding time intervals into an updated sequence of data points. Then, starting from the recorded data point corresponding to the most recent (newest) time interval of the sequence, groups of N adjacent data points are formed. In the event that the last group includes fewer than N number of recorded data points, padded data points (e.g., zeroes) are added to the last group until there are N number of entry values, where an entry value is either a recorded data point or a padded data point. As such, if there is more than one group that is formed, the group of data points corresponding to the most recent time intervals always includes N number of recorded data points and the group of data points corresponding to the least recent time intervals always includes up to N number of recorded data points and a corresponding padded data point for each data point fewer than N.

At 612, the one or more groups of N entry values are compressed into one or more updated compressed blocks. An updated compressed block is formed from each group of N entry values.

At 614, the new recorded data points are grouped into one or more groups of N data points. The new data points are sorted by reverse chronological order and grouped into one or more groups of N recorded data points.

At 616, the one or more groups of N data points are compressed into one or more new compressed blocks.

While the example of process 600 describes adding padded data points, if needed, to a group of data points corresponding to the least recent time intervals, in another example, padded data points, if needed, can be added to the group of data points corresponding to the most recent time intervals.

Figure 7:
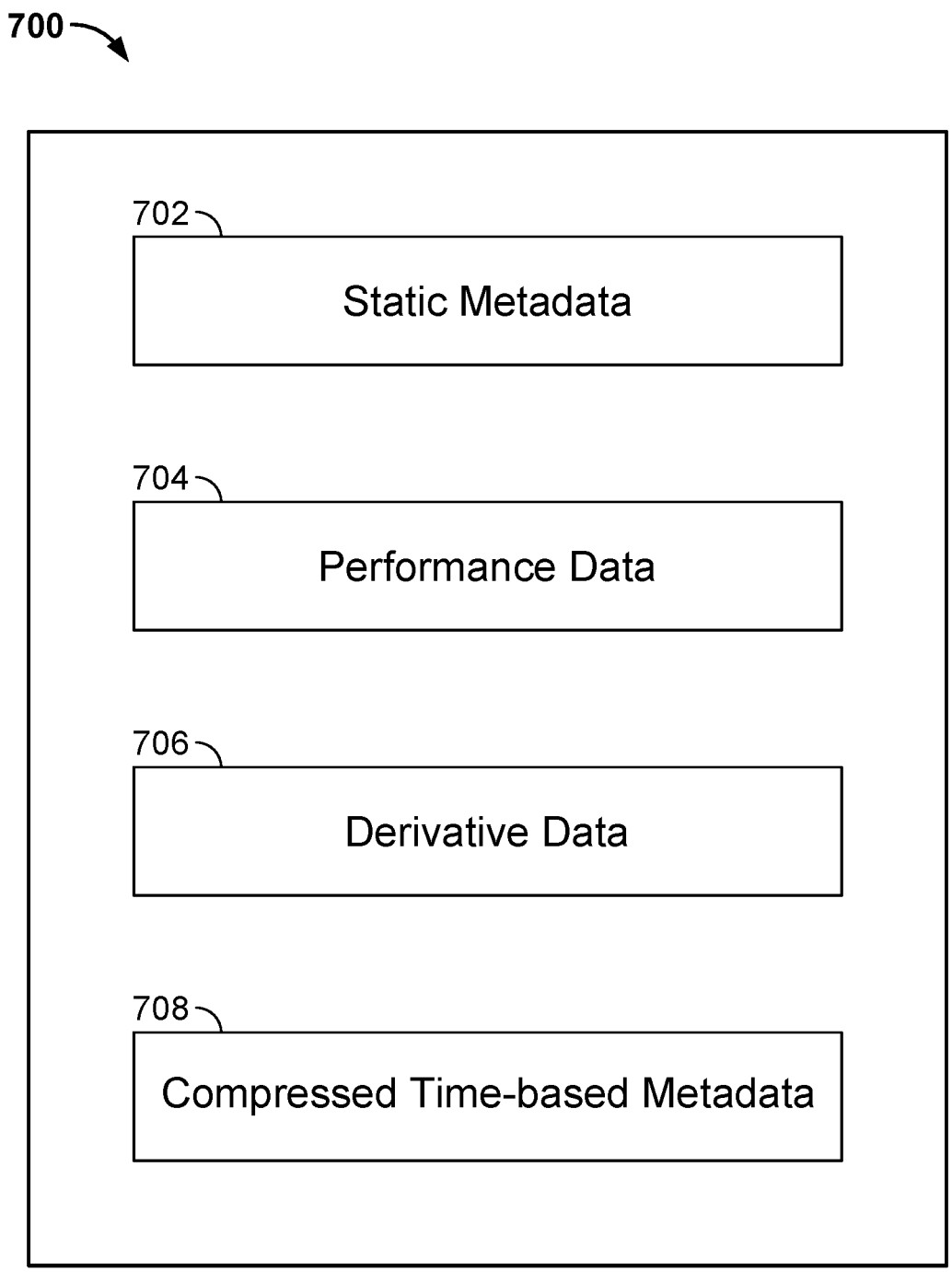
FIG. 7 is a diagram showing an example of a document corresponding to an item.

FIG. 7 is a diagram showing an example of a document corresponding to an item. In the example of FIG. 7, document 700 corresponds to a particular item. For example, document 700 stores collected metadata related to an online video that is hosted by a media platform. While not shown in FIG. 7, document 700 includes an identifier that corresponds to the online video. Static metadata 702 may include information associated with the video that does not change or is infrequently changed such as, for example, the title of the video, the identifier of the user that had uploaded the video, the identifier of the platform (e.g., publisher) to which the video was uploaded, and the timestamp associated with the upload of the video. Performance data 704 may include information associated with a current metric of user engagement associated with the video such as, for example, the most recently determined total view count and the total number of comments left on the video. Derivative data 706 may include information that was automatically detected from the content of the video such as, for example, one or more languages spoken in the video and a detected demographic of viewers of the video. Compressed time series data 708 includes compressed blocks corresponding to time series data associated with the video. For example, if time series data included various types of trends (e.g., the number of views, the number of likes, the number of comments, the number of engagements, and the number of followers/subscribers), then compressed time series data 708 may include a corresponding set of compressed blocks and other related data for each respective type of trend.

Figure 8:
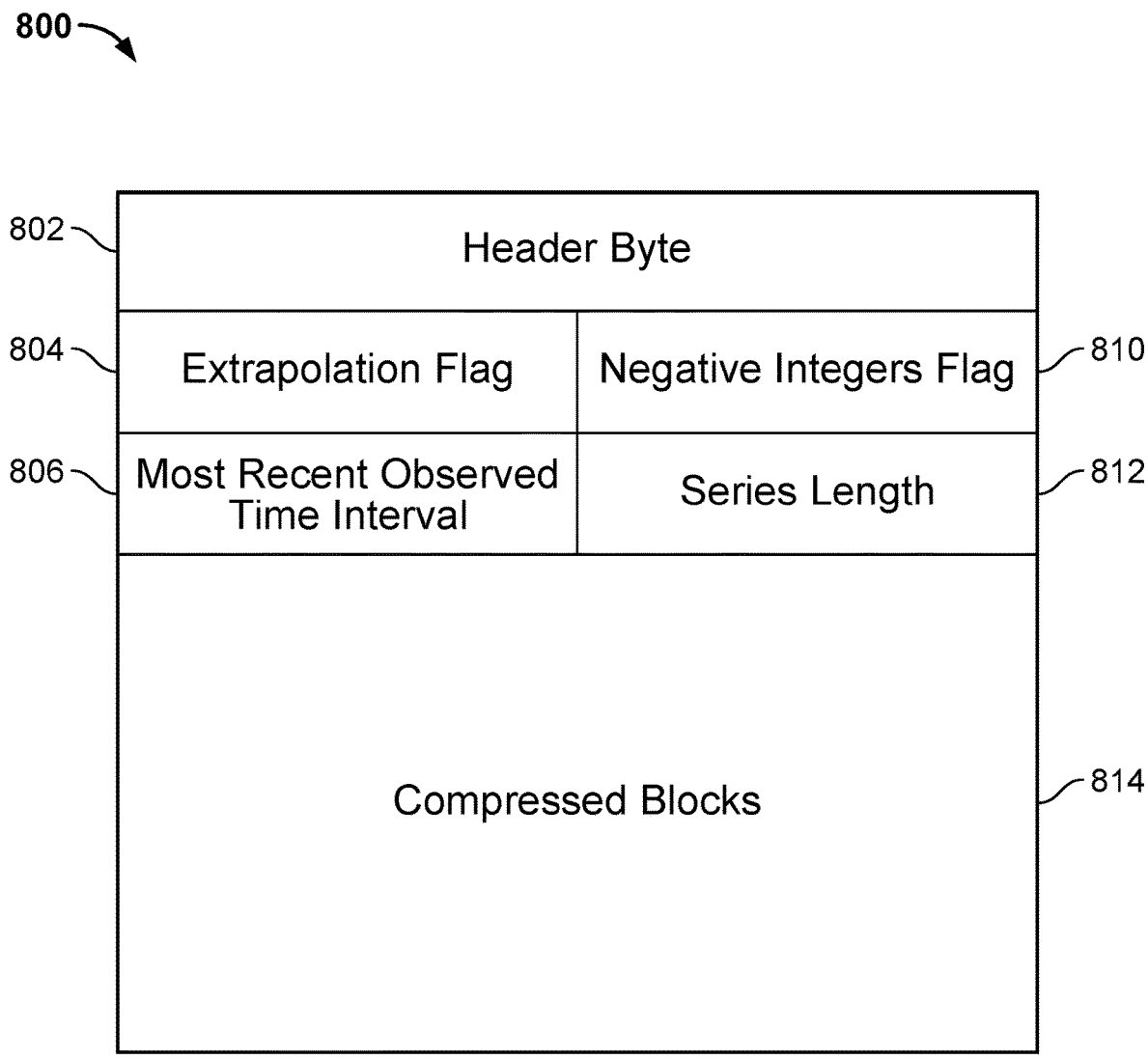
FIG. 8 is a diagram showing an example format of compressed time series data in a document corresponding to an item.

FIG. 8 is a diagram showing an example format of compressed time series data in a document corresponding to an item. In some embodiments, compressed time series data 708 of FIG. 7 may include one or more instances of time series data stored in format 800, where each instance of time series data may store data points corresponding to a different type of metadata. Format 800 includes header byte 802, extrapolation flag byte 804, most recent observed time interval 806, negative integers flag 810, series length 812, and compressed blocks 814.

Header byte 802 includes a value that denotes a version number associated with format 800. For example, header byte 802 comprises six bits.

Extrapolation flag 804 includes a flag (e.g., a one-bit value) that denotes whether data points should be extrapolated for time intervals for which data points were not available or had not yet been collected from a source platform. One example reason to set the flag to a value that indicates to not perform extrapolation is if it is detected that the item (e.g., a video) is no longer available at a source platform and therefore, no extrapolation is to be performed for the item as it is anticipated that further data points for the video will be zero.

Most recent observed time interval 806 includes a value that denotes the time interval (e.g., timestamp) that is associated with the most recent recorded data point that is included in compressed blocks 814.

Negative integers flag 810 includes a flag that indicates whether a recorded data point included in compressed blocks 814 is a negative integer. As mentioned above, in some embodiments, the presence of negative recorded data points will cause all the recorded data point values to be mapped to positive ones using a predetermined mapping scheme.

Series length 812 includes a value that indicates the total number of recorded data points that are stored in compressed blocks 814.

Compressed blocks 814 include one or more compressed blocks of data points. As mentioned above, each compressed block may include, at least, a (e.g., five-bit) value denoting the number of bits used to represent each recorded data point or padded data point in that compressed block. Also, as mentioned above, each compressed block includes a predetermined number (N) of entries, where each entry value comprises either a recorded data point or a padded data point (e.g., zero). Because data points are divided into groups of N before being compressed and stored as compressed blocks, when compressed blocks 814 is read to perform aggregation in response to a search query, it is likely that (far) fewer than all of the compressed blocks (starting from blocks that are associated with the most recent time intervals) need to be decompressed, thereby greatly reducing the computation cost that is typically associated with retrieving time series data from storage. As mentioned above, unlike some conventional techniques that store separate documents corresponding to data at different timestamps for a single item and/or a set of static metadata, the document that is described in FIG. 8 is operable to store multiple data points corresponding to different time intervals for the same item.

Format 800 is merely an example format for storing compressed blocks and also related information. In general, compressed blocks can be stored in any format that includes information (e.g., flags or other fields) that describes how to read (e.g., decompress) the compressed data (e.g., by indicating at least which compression technique was used to generate the compressed blocks).

FIG. 9 is a diagram showing examples of two groups of data points corresponding to an item. In the example of FIG. 9, 11 data points collected for a particular item have been sorted in reverse chronological order based on their respective time intervals. Each of time intervals T11 through T1 is associated with the same fixed length of time (e.g., 24 hours or one day) and is consecutive in time to each immediately adjacent time interval. For example, if each time interval were one day in length, then time intervals T11 through T1 may correspond to respective ones of the days starting from Aug. 11, 2019 through Aug. 1, 2019. The recorded data points corresponding to respective ones of time intervals T11 through T1 are 456, 985, 56, 567, 641, 4, 32, 231, 765, 524, and 12, where T11 is the most recent time interval and T1 is the oldest time interval. In the example of FIG. 9, the predetermined number (N) of entries in a group is eight. As such, the newest eight recorded data points (456, 985, 56, 567, 641, 4, 32, and 231) are grouped into group 904. The remaining three recorded data points (765, 524, 12) are then padded with five padded data points (0s) to form group 902.

While not shown in the example of FIG. 9, in some embodiments, to compress group 902, the largest data point of group 902, recorded data point 765 corresponding to time interval T3, is identified. It is determined that 10 is the minimum number of bits that is needed to represent 765 and therefore, each data point of group 902 is rewritten in binary form with 10 bits. Normally, each data point, which is an integer, would be represented by 32 bits so using 10 bits instead to represent each data point is a significant reduction in the storage space that is needed to store such time series data. In some embodiments, to compress group 904, the largest recorded data point of group 904, data point 985 corresponding to time interval T10, is identified. It is determined that 10 is the minimum number of bits that is needed to represent 985 and therefore, each data point of group 904 is rewritten in binary form with 10 bits.

Figure 10:
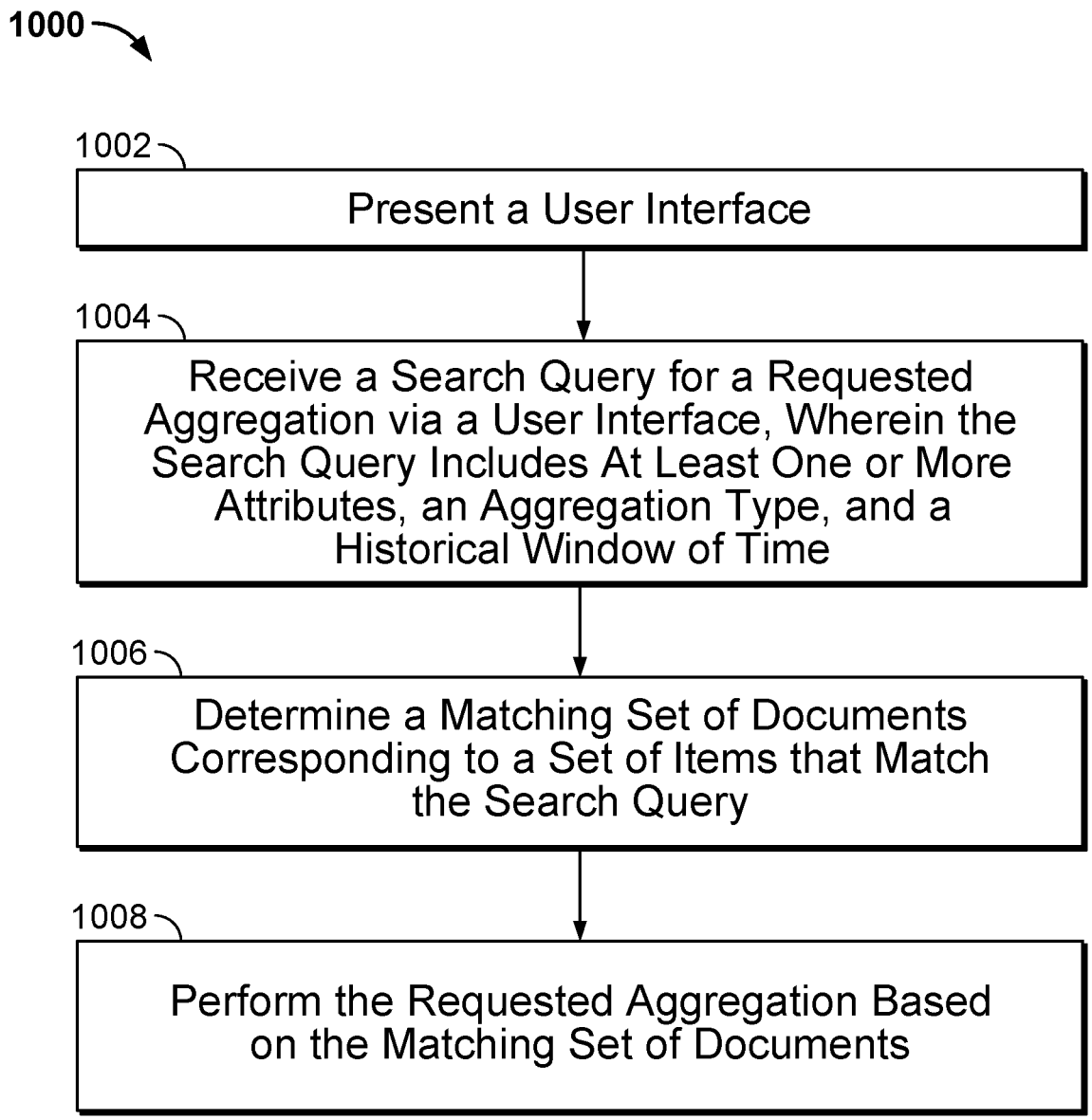
FIG. 10 is a flow diagram showing an example of a process performing a requested aggregation based on a search query.

FIG. 10 is a flow diagram showing an example of a process performing a requested aggregation based on a search query. In some embodiments, process 1000 is implemented at aggregation server 108 of system 100 of FIG. 1.

At 1002, a user interface is presented. The user interface comprises fields, selections, and/or other interactive elements that enable a user to input a search query.

At 1004, a search query for a requested aggregation is received via the user interface, wherein the search query includes at least one or more attributes, an aggregation type, and a historical window of time. The search query specifies at least attributes of items and also which type of metadata corresponding to the items to use to perform a specified aggregation type. The search query also specifies a historical window of the time over which to perform the aggregation.

At 1006, a matching set of documents corresponding to a set of items that match the search query is determined. At least a portion of the search query is compared against the content in documents corresponding to items to determine a set of matching documents.

At 1008, the requested aggregation is performed based on the matching set of documents. The requested aggregation is determined using the content of each of the matching set of documents.

Figure 11:
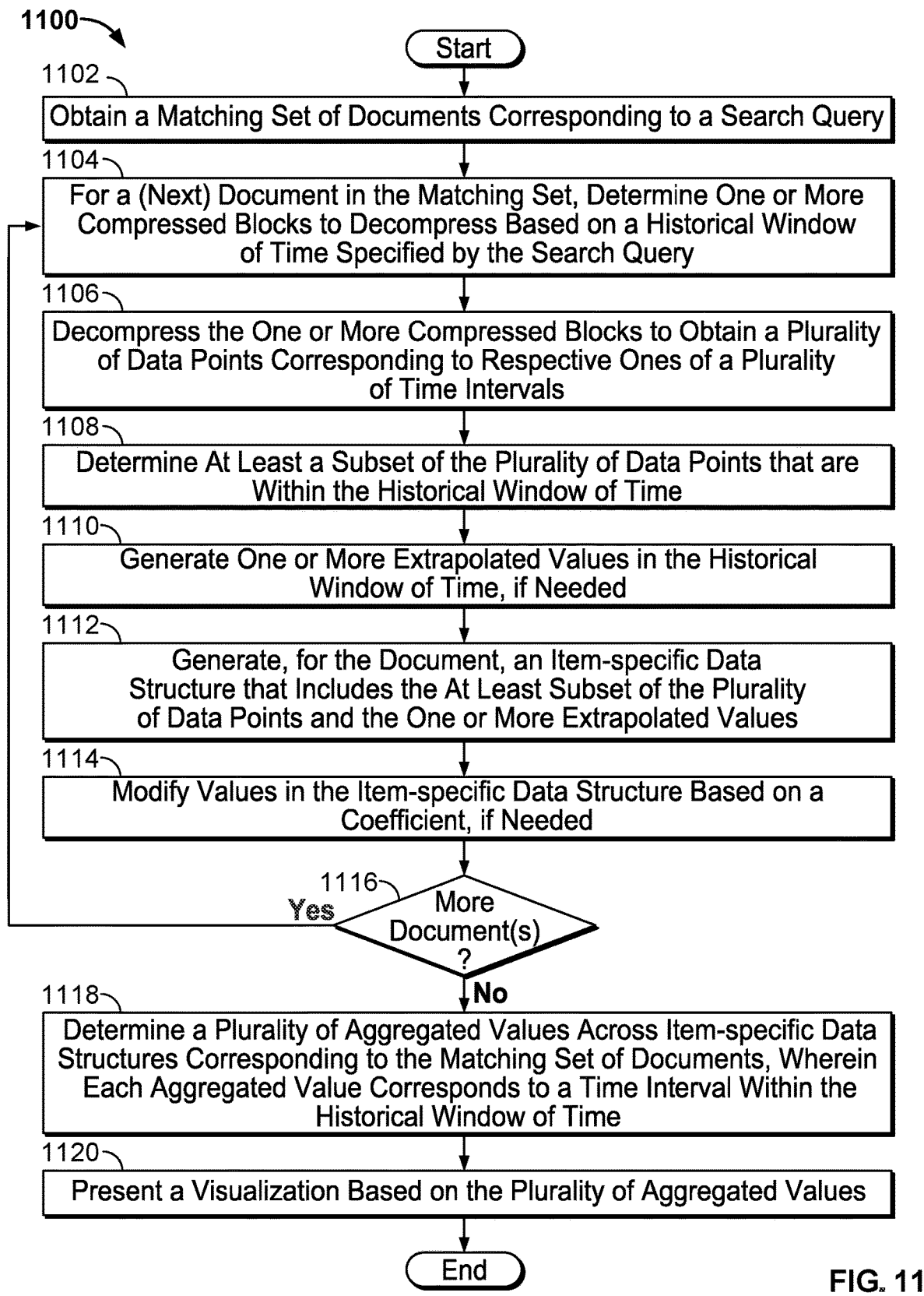
FIG. 11 is a flow diagram showing a first example of a process performing an aggregation of data points stored in documents corresponding to various items based on a search query.

FIG. 11 is a flow diagram showing a first example of a process performing an aggregation of data points stored in documents corresponding to various items based on a search query. In some embodiments, process 1100 is implemented at aggregation server 108 of system 100 of FIG. 1. In some embodiments, process 1100 is implemented at database server 106 of system 100 of FIG. 1.

Process 1100 describes an example of aggregating data points corresponding to various time intervals across different items that match a search query.

At 1102, a matching set of documents corresponding to a search query is obtained. As mentioned above, the search query specifies at least attributes (e.g., keywords) of items and also which type of metadata corresponding to the items to use to perform a specified aggregation type. The search query also specifies a historical window of the time over which to perform the aggregation. The historical window of time that is specified by the search query includes at least one time interval. The search query is compared against documents that include item-specific metadata (e.g., at a database server). In particular, at least some of the attributes that are included in the search query are compared against the content of various item-specific documents. If an attribute from the search query matches content in an item-specific document, that document is determined to be a matching document.

For example, if items were online videos, a search query may specify: the total number of views each day across videos that include the keyword "law" over the last week (seven days). In this example search query, the attributes include the keyword "law," the type of metadata is the total number of views, the specified aggregation type is to aggregate the number of views across all matching video(s) over each day, and the historical window of time is the last seven days relative to the day that the search query was submitted.

At 1104, for a (next) document in the matching set, one or more compressed blocks are determined to be decompressed based on a historical window of time specified by a search query. As mentioned above, in some embodiments, each compressed block is generated from a group of a predetermined number (N) of recorded data points and/or padded data points. Furthermore, in some embodiments, the document stores the most recent time interval (e.g., Most Recent Observed Time Interval 806 in FIG. 8) corresponding to a recorded data point in one or more compressed blocks in the document and the document stores the total number of recorded data points (e.g., "Series Length" 812 in FIG. 8). Given N, the most recent time interval, the total number of recorded data points, the fact that all the data points correspond to the same fixed length of time, the fact that consecutive/adjacent data points correspond to consecutive time intervals (each of the same fixed length of time), and the fact that all the data points had been sorted by the reverse chronological order of their respective time intervals, it is determined how many compressed blocks, starting from the one that is most recently generated, are to be decompressed to obtain the data points with respective time intervals that are within the historical window of time that is specified by the search query. It is likely that fewer than all of the compressed blocks of the document will be decompressed because it is likely that the historical window of time that is specified by the search query will be relatively short compared to the overall window of time during which data points have been collected for the item.

At 1106, the one or more compressed blocks are decompressed to obtain a plurality of data points corresponding to respective ones of a plurality of time intervals. As mentioned above, for example, a compressed block, comprising a series of binary values (ones and zeros), can be decompressed by first checking for the number of bits that is used to encode each data point or padded data point in the compressed block from the first five bits in the block. Then each subgroup of binary values of the number of bits that is used to encode each data point or padded data point is read from the compressed block and decoded to recover the original recorded data point value or padded data point.

At 1108, at least a subset of the plurality of data points that are within the historical window of time is determined. The first recorded data point that is determined in the recovered series of values is determined to be the first recovered recorded data point and is also determined to be the most recent data point (based on the fact that the data points were sorted by reverse chronological order prior to being compressed). The most recent data point also corresponds to the most recent time interval (e.g., "Most Recent Observed Time Interval" 806 in FIG. 8). Based on knowledge that a data point is stored corresponding to every time interval prior to the most recent time interval (e.g., up until a predetermined time interval), that all the data points correspond to the same fixed length of time, and that consecutive/adjacent data points correspond to consecutive time intervals (each of the same fixed length of time), the respective time interval that corresponds to each recovered data point can be determined. Once the corresponding time interval has been determined for each recovered data point, the (at least) subset of recovered data points whose respective time intervals fall within the historical window of time is determined.

For example, the corresponding time interval corresponding to each recorded data point of the blocks can be determined as follows: If the most recent time of the most recent data point is T (which corresponds to the time interval of the first recorded data point of the first/most recently generated compressed block), given that each block is of a fixed size N, and that each data point corresponds to consecutive time intervals of fixed length, the following can be determined: the first recorded data point of the second block corresponds to time T-N, the third data point of the fourth block corresponds to time T-3*N-2, etc.

At 1110, one or more extrapolated values in the historical window of time are generated, if needed. If the historical window of time that is specified by the search query includes time intervals for which data points are not stored in the decompressed block(s), then the value may be extrapolated for those time intervals. For example, the historical window of time requests data points from August $10^{th}$ to August $1^{st}$ but the most recent time interval indicates August $7^{th}$. Therefore, the data points corresponding to August $8^{th}$ through August $10^{th}$ would need to be extrapolated (e.g., if the extrapolation flag in the document indicates that extrapolation is appropriate).

At 1112, an item-specific data structure that includes the at least subset of the plurality of data points and the one or more extrapolated values is generated for the document. In some embodiments, each of the recovered data points and extrapolated values, if any, are inserted into an item-specific data structure. For example, the item-specific data structure comprises a vector or an array and each element of the vector/array corresponds to a respective time interval within the historical window of time. Then, the data point or extrapolated value that corresponds to each time interval within the historical window of time is placed in the corresponding element within the vector/array.

At 1114, values in the item-specific data structure are modified based on a coefficient, if needed. In some embodiments, each value in the data structure is modified (e.g., multiplied) by a coefficient. For example, the coefficient is user input and is associated with a particular audience demographic or other audience segmentation factor. For example, the coefficient may be user input per video based on an expected portion of the data points that are associated with a particular demographic. The modified values in the data structure would then reflect only the contribution of that particular audience demographic.

The coefficients could be obtained from the same document that stores the item-specific information. The coefficients can be user defined, such as, for example, using one of the following examples:

1) A static value can be directly defined. For example, the coefficient is 1.2, against which the data points will be multiplied.
2) The name of another field in the document can be referred. For example, the coefficient can be defined as the "audience percentage that is males within the 18-24 age range."
3) A function that is based on fields that already exist in the document can be defined. For example, the coefficient can be defined as multiply the series by ["audience percentage that is males 18-24" times "audience percentage that is from the US" times "duration of the video"].
4) A script that operates on and transforms the series data in any arbitrary way can also be defined.

At 1116, it is determined whether there is at least one more document in the matching set of documents. In the event that there is at least one more document in the matching set of documents, control is returned to 1104 to generate an item-specific data structure corresponding to the next document. Otherwise, in the event that there are no more documents in the matching set of documents, control is transferred to 1118.

At 1118, a plurality of aggregated values across item-specific data structures corresponding to the matching set of documents is determined, wherein each aggregated value corresponds to a time interval within the historical window of time. After a corresponding data structure is generated for each matching document, the values across the same element in the data structures are combined to generate an aggregated data structure of aggregated values. Each aggregated value in an element of the aggregated data structure represents the aggregated value corresponding to a particular time interval within the historical window of time.

At 1120, a visualization is presented based on the plurality of aggregated values. For example, the visualization can be a graphical plot or a graph that illustrates the aggregated value at each time interval across the historical window of time. For example, the aggregated value corresponding to a particular time interval could be a single number that is the result of summing up the respective values from each document, or it could be a list of the identifiers of the top predetermined number of documents that performed best during that interval. The visualization is presented at a user interface so that the user can be shown the time series aggregation result that was generated in response to his or her submitted search query.

FIG. 12 is a diagram showing an example of item-specific data structures of data points corresponding to three different items. For example, using a process such as process 1100 of FIG. 11, three documents corresponding respectively to Item A, Item B, and Item C are determined to match a search query. The search query is specified to aggregate data points of a specified statistical information type at each time interval within seven historical time intervals (T7, T6, T5, T4, T3, T2, and T1). Each of time intervals T7 through T1 is associated with the same fixed length of time (e.g., 24 hours or one day) and is consecutive in time to each immediately adjacent time interval. For example, if each time interval were one day in length, then time intervals T7 through T1 may correspond to respective ones of the days starting from Aug. 7, 2019 through Aug. 1, 2019. The document corresponding to Item A was obtained and one or more compressed blocks in the document were decompressed. Then, seven data points that are recovered from the decompression corresponding to respective ones of the time intervals T7, T6, T5, T4, T3, T2, and T1 are obtained and stored in item-specific data structure 1202. The same process is performed for Item B and Item C, respectively, to obtain item-specific data structures 1204 and 1206. Each of item-specific data structures 1202, 1204, and 1206 includes seven elements, each corresponding to one respective time interval of the historical window of time that was specified by the search query. To determine the aggregate values across Items A, B, and C across historical time intervals T7, T6, T5, T4, T3, T2, and T1, all the values within the element corresponding to T7 across each of item-specific data structures 1202, 1204, and 1206 are summed, all the values within the element corresponding to T6 across each of data structures 1202, 1204, and 1206 are summed, and so forth. Specifically, for example, according to the values shown in FIG. 12, the aggregate values across Items A, B, and C over historical time interval T7 is 453+65+4=522.

Returning to the specific example described with step 1102 of process 1100 of FIG. 11, the search query specifies: the total number of views each day across videos that include the keyword "law" over the last week (seven days). Assume that the last seven days correspond to historical time intervals T7, T6, T5, T4, T3, T2, and T1. Assume that Items A, B, and C correspond to three respective videos whose corresponding documents have been determined to match the search query. Item-specific data structure 1202 was generated to indicate the total number of views that video Item A had received on each day of T7, T6, T5, T4, T3, T2, and T1. Item-specific data structure 1204 was generated to indicate the total number of views that video Item B had received on each day of T7, T6, T5, T4, T3, T2, and T1. Data structure 1206 was generated to indicate the total number of views that video Item C had received on each day of T7, T6, T5, T4, T3, T2, and T1. Then, by summing all the values corresponding to time intervals T7, T6, T5, T4, T3, T2, and T1 from item-specific data structures 1202, 1204, and 1206, an aggregated total number of views across videos, Items A, B, and C, can be determined across T7, T6, T5, T4, T3, T2, and T1. The aggregated total number of views across videos, Items A, B, and C, determined across T7, T6, T5, T4, T3, T2, and T1, can be presented as a visualization at a user interface to help a user better understand the trend of video viewing of videos pertaining to the keyword "law" over the last week.

Figure 13:
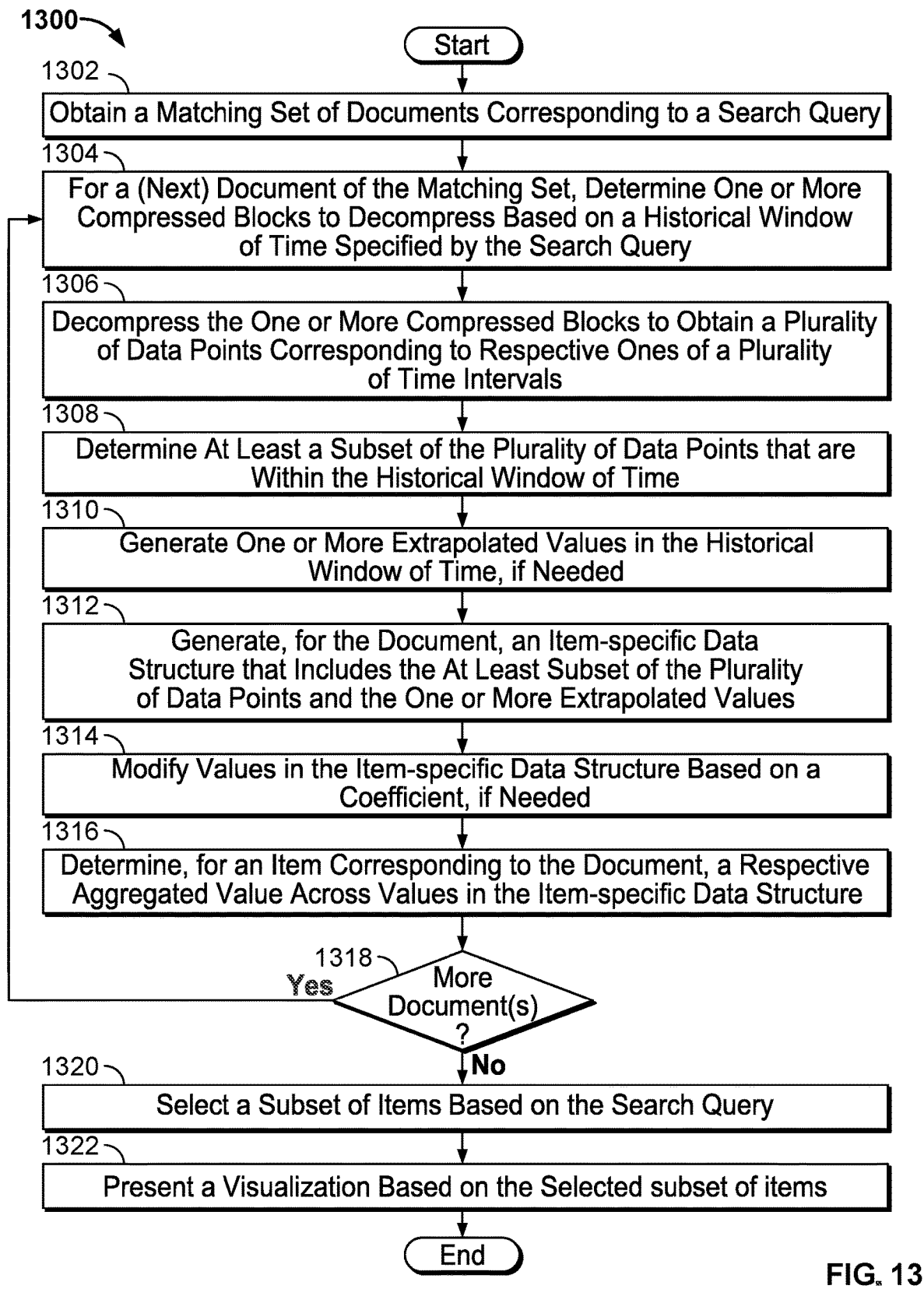
FIG. 13 is a flow diagram showing a second example of a process performing an aggregation of data points stored in documents corresponding to various items based on a search query.

FIG. 13 is a flow diagram showing a second example of a process performing an aggregation of data points stored in documents corresponding to various items based on a search query. In some embodiments, process 1300 is implemented at aggregation server 108 of system 100 of FIG. 1. In some embodiments, process 1300 is implemented at database server 106 of system 100 of FIG. 1.

Process 1300 describes an example of aggregating data points across various time intervals for each item that matches a search query.

At 1302, a matching set of documents corresponding to a search query is obtained. As mentioned above, the search query specifies at least attributes (e.g., keywords) of items and also which type of metadata corresponding to the items to use to perform a specified aggregation type. The search query also specifies a historical window of the time over which to perform the aggregation. The historical window of time that is specified by the search query includes at least one time interval. The search query is compared against documents that include item-specific metadata (e.g., at a database server). In particular, at least some of the attributes that are included in the search query are compared against the content of various item-specific documents. If an attribute from the search query matches content in an item-specific document, that document is determined to be a matching document.

For example, if items were online videos, a search query may specify: the five most viewed videos that include the keyword "law" over the last week (seven days). In this example search query, the attributes include the keyword "law," the type of metadata is the total number of views, the specified aggregation type is to aggregate the number of views of each video across seven days, and the historical window of time is the last seven days relative to the day that the search query was submitted.

At 1304, for a (next) document in the matching set, one or more compressed blocks are determined to be decompressed based on a historical window of time specified by a search query. Step 1304 can be performed similarly to step 1104 of process 1100 of FIG. 11.

At 1306, the one or more compressed blocks are decompressed to obtain a plurality of data points corresponding to respective ones of a plurality of time intervals. Step 1306 can be performed similarly to step 1106 of process 1100 of FIG. 11.

At 1308, at least a subset of the plurality of data points that are within the historical window of time is determined. Step 1308 can be performed similarly to step 1108 of process 1100 of FIG. 11.

At 1310, one or more extrapolated values in the historical window of time are generated, if needed. Step 1310 can be performed similarly to step 1110 of process 1100 of FIG. 11.

At 1312, a data structure that includes the at least subset of the plurality of data points and the one or more extrapolated values is generated for the document. Step 1312 can be performed similarly to step 1112 of process 1100 of FIG. 11.

At 1314, values in the data structure are modified based on a coefficient, if needed. Step 1314 can be performed similarly to step 1114 of process 1100 of FIG. 11.

At 1316, a respective aggregated value across values in the data structure is determined for an item corresponding to the document. The values in the data structure are added together to generate an aggregated value corresponding to that item for the historical window of time.

At 1318, it is determined whether there is at least one more document in the matching set of documents. In the event that there is at least one more document in the matching set of documents, control is returned to 1304 to generate a data structure corresponding to the next document. Otherwise, in the event that there are no more documents in the matching set of documents, control is transferred to 1320.

At 1320, a subset of items is selected based on the search query. For example, a number of items that is specified by the search query that is associated with the highest (or lowest) aggregated values is selected. Returning to the specific example in which the search query requested the five most viewed videos that include the keyword "law" over the last week (seven days), after various matching videos' corresponding total views over the last week are aggregated, the five videos with the most aggregated views are selected (e.g., by scanning all the aggregated views and identifying the five videos with the most aggregated views).

At 1322, a visualization is presented based on the selected subset of items. For example, the visualization can be a list that shows the selected items. The visualization is presented at a user interface so that the user can be shown the time series aggregation result that was generated in response to his or her submitted search query.

Figure 14:
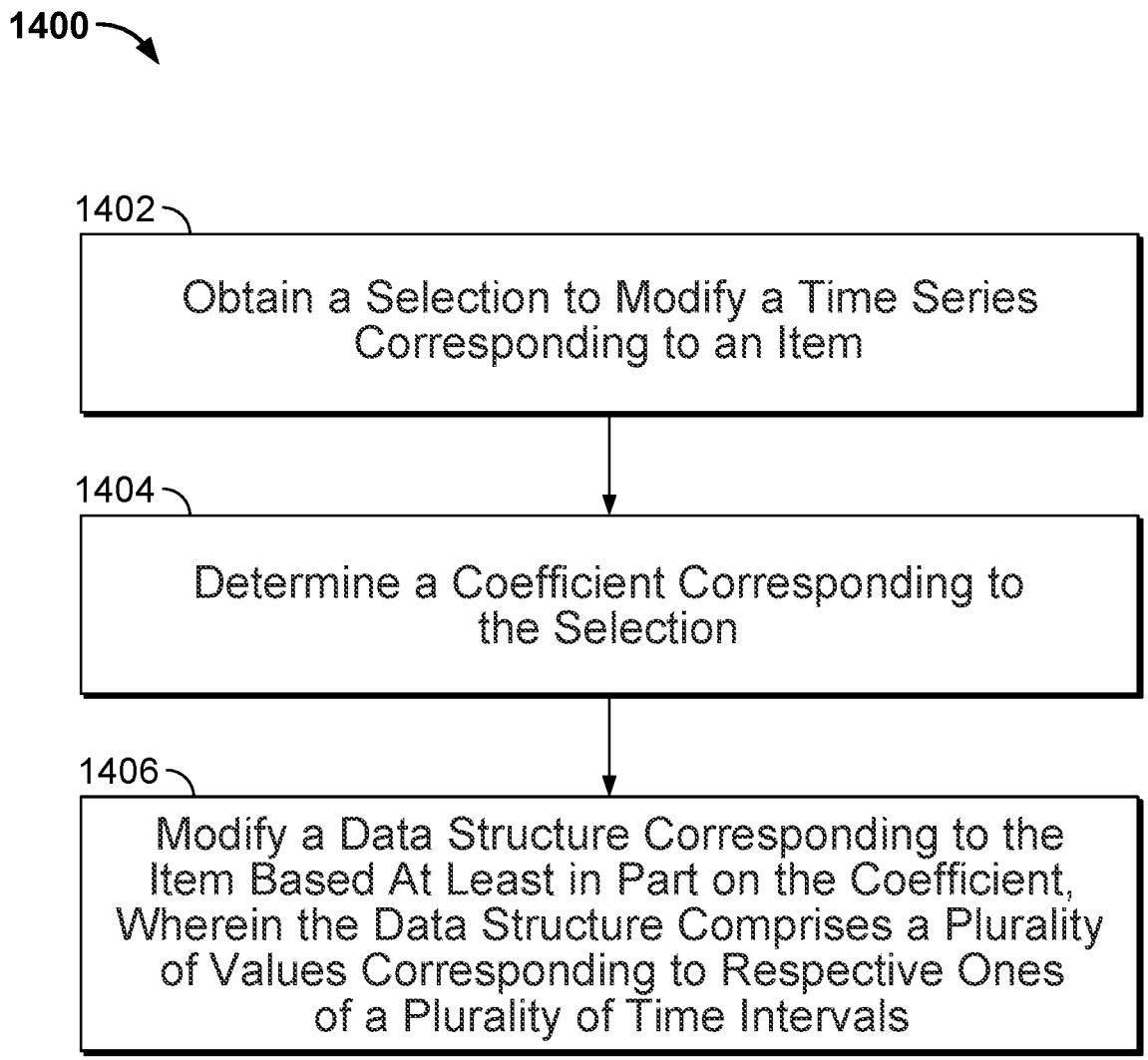
FIG. 14 is a flow diagram showing an example process of modifying values in a data structure corresponding to an item based on a coefficient.

FIG. 14 is a flow diagram showing an example process of modifying values in a data structure corresponding to an item based on a coefficient. In some embodiments, process 1400 is implemented at aggregation server 108 of system 100 of FIG. 1. In some embodiments, process 1400 is implemented at database server 106 of system 100 of FIG. 1. In some embodiments, step 1114 of process 1100 of FIG. 11 may be implemented using process 1400. In some embodiments, step 1314 of process 1300 of FIG. 13 may be implemented using process 1400.

At 1402, a selection to modify a time series corresponding to an item is obtained. In some embodiments, an option to modify the time series data points that have been collected for the item for a particular aggregation the data points are to be a part of is received (e.g., via user input).

At 1404, a coefficient corresponding to the selection is determined. The coefficient comprises a value that is greater than or less than one. In various embodiments, a coefficient is user input.

For example, a coefficient that is less than one can be used to approximate the percentage of the time series data points that is attributable to a particular demographic (e.g., males between the ages of 18-35).

In another example, if an item were an online video, a coefficient that is greater than one can be used to weight each data point as a function of the length of the video. For example, if the time series represents views gained by the video over a few days, and the duration of the video can be used as a coefficient, then multiplying the series by the coefficient would approximate the total seconds of content watched each day (number of views*duration).

At 1406, a data structure corresponding to the item based at least in part on the coefficient is modified, wherein the data structure comprises a plurality of values corresponding to respective ones of a plurality of time intervals. In some embodiments, each value in the item-specific data structure (e.g., vector or array) is multiplied (or otherwise modified) using the coefficient.

Figure 15:
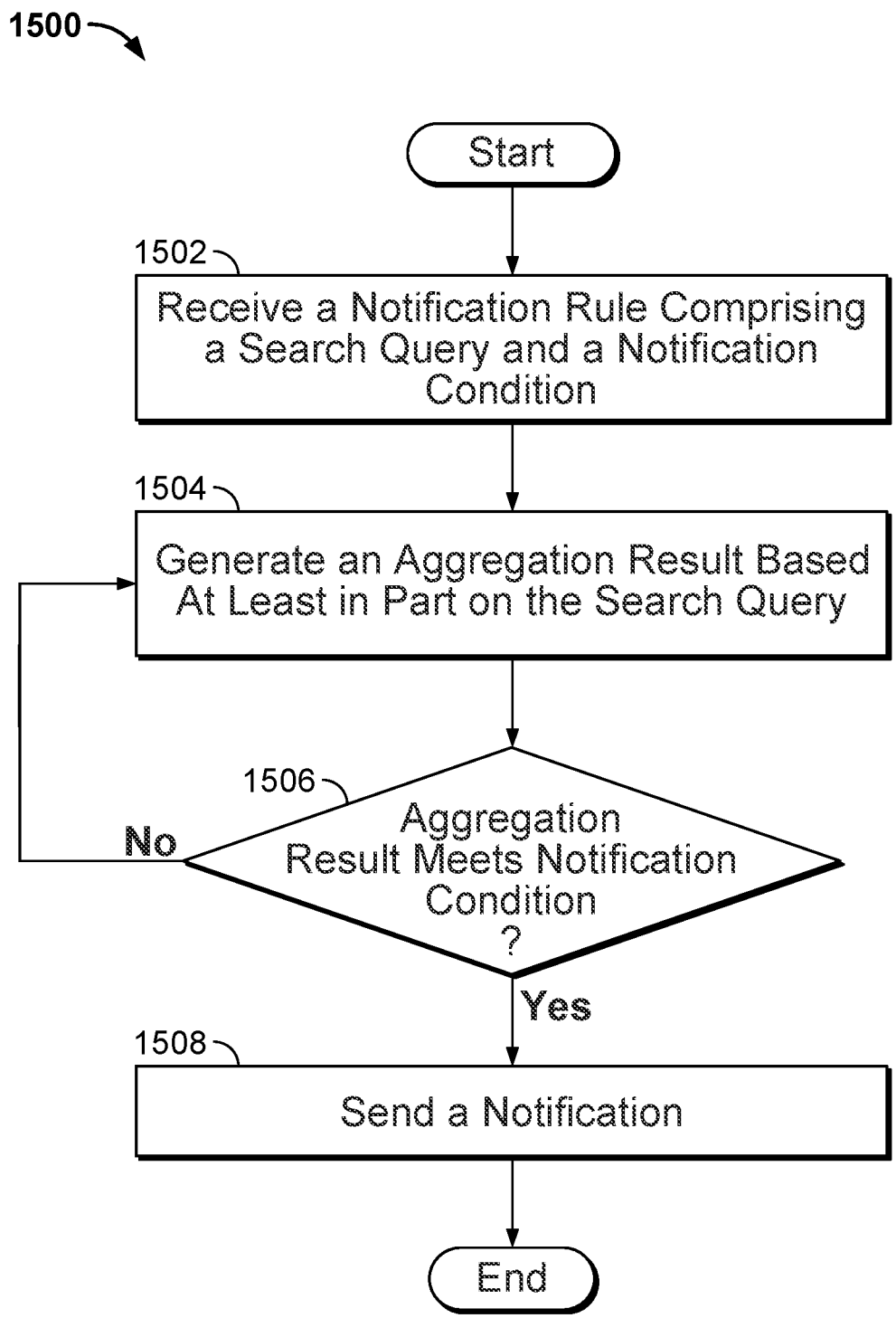
FIG. 15 is a flow diagram showing an example process of determining whether a time series aggregation meets a notification condition.

FIG. 15 is a flow diagram showing an example process of determining whether a time series aggregation meets a notification condition. In some embodiments, process 1500 is implemented at aggregation server 108 of system 100 of FIG. 1. In some embodiments, process 1500 is implemented at database server 106 of system 100 of FIG. 1.

Process 1500 is an example process that describes that a notification rule with a search query and notification condition can be used to periodically perform the aggregation requested by the search query and to determine whether the notification condition is met by the aggregation result. In the event that the aggregation result meets the notification condition, a notification is sent (e.g., to a user).

At 1502, a notification rule comprising a search query and notification condition is received. The search query may specify attribute(s) of items, a statistical information type, a requested aggregation type, and a historical window of time. The notification condition may describe a type of aggregation result for which a notification should be generated. For example, the search query may request to identify the most watched video that includes the keyword "law" in the last week and the notification condition may be to determine whether the determined most watched video is uploaded by a specified user identifier.

At 1504, an aggregation result is generated based at least in part on the search query. An aggregation is performed based on the information included in the search query. For example, the aggregation may be performed using process 1100 of FIG. 11 or process 1300 of FIG. 13.

At 1506, it is determined whether an aggregation result meets the notification condition. In the event that the aggregation result meets the notification condition, control is transferred to 1508. Otherwise, in the event that the aggregation result does not meet the notification condition, control is returned to 1504 to generate a new aggregation result at a later time.

At 1508, a notification is sent. For example, the notification may be sent to a user interface. In another example, the notification (e.g., email) may be sent to a user whose contact information (e.g., email address) is associated with the notification rule.

Figure 16:
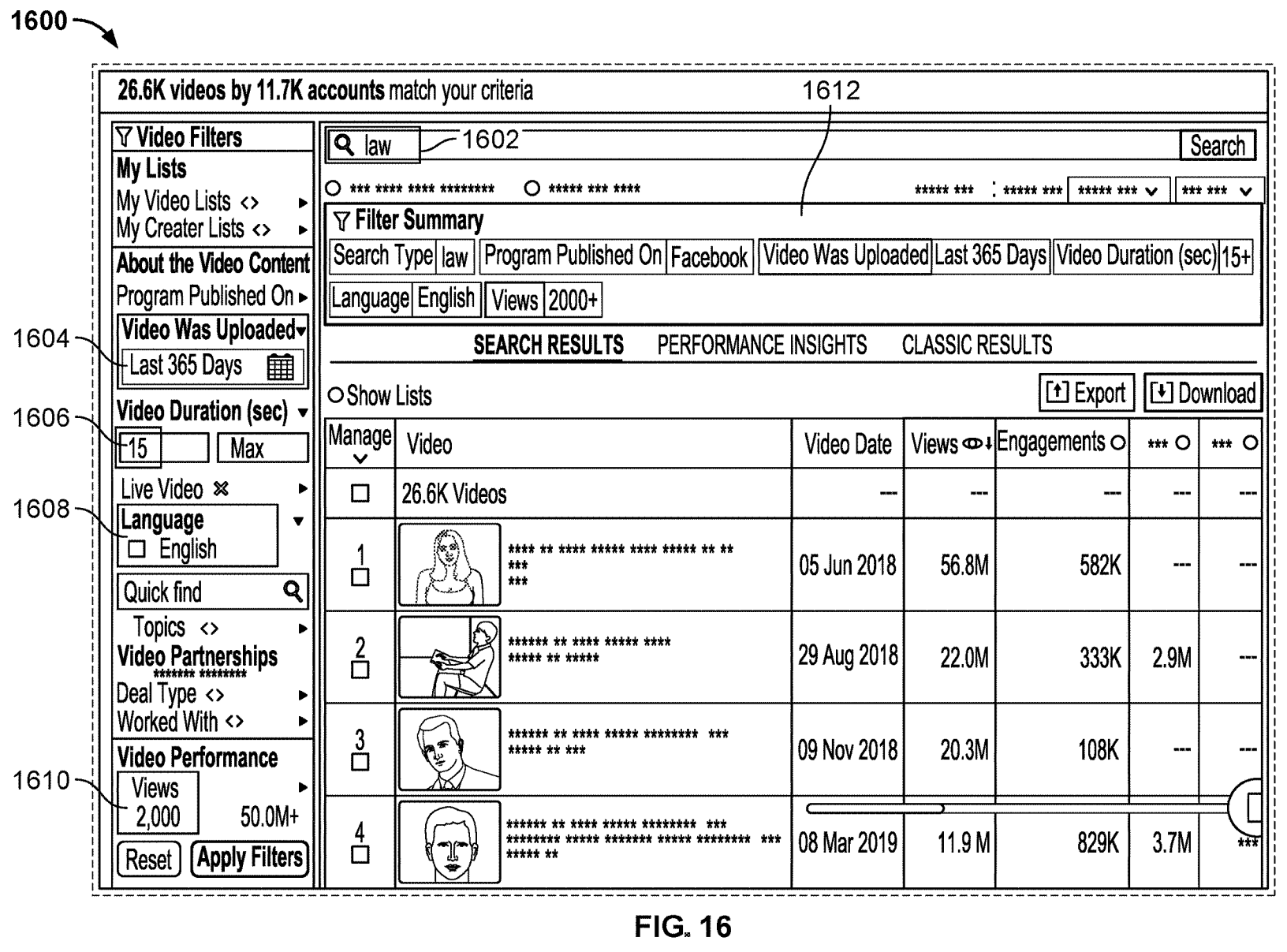

FIG. 16 is a diagram showing an example of a user interface for receiving a search query. User interface 1600 includes various selections, fields, and/or interactive elements that a user can use to input a search query for aggregating time series video statistical information.

Input field 1602 allows users to input one or more keywords associated with videos that are published at various platforms (e.g., websites, social media platforms). In the example of FIG. 16, input field 1602 includes the keyword "law." Video uploaded time selection field 1604 allows users to identify a time period in which a video was uploaded. In the example of FIG. 16, video uploaded selection field 1604 determines that the video should have been uploaded within 365 days from the current date. Video duration field 1606 allows users to specify the desired maximum and/or minimum length of a video. In the example of FIG. 16, video duration field 1606 includes "15" seconds as the minimum length but specifies no maximum length. Language selection field 1608 allows a user to select a language that is spoken in the video. In the example of FIG. 16, language selection field 1608 is set to "English." Video performance field 1610 specifies the minimum number of views required. In the example of FIG. 16, video performance field 1610 includes "2,000" as the minimum number of views. Filter Summary 1612 summarizes the current inputs into the other fields at user interface 1600 and such inputs can form at least a portion of a search query. In the example of FIG. 16, the input search query requests for the total number of views per day of videos uploaded to the platform, Facebook, that match the keyword "law" and that were uploaded within the last 365 days, are more than 15 seconds in length, are in English, and have been viewed at least 2,000 times since their respective upload dates.

Figure 17:
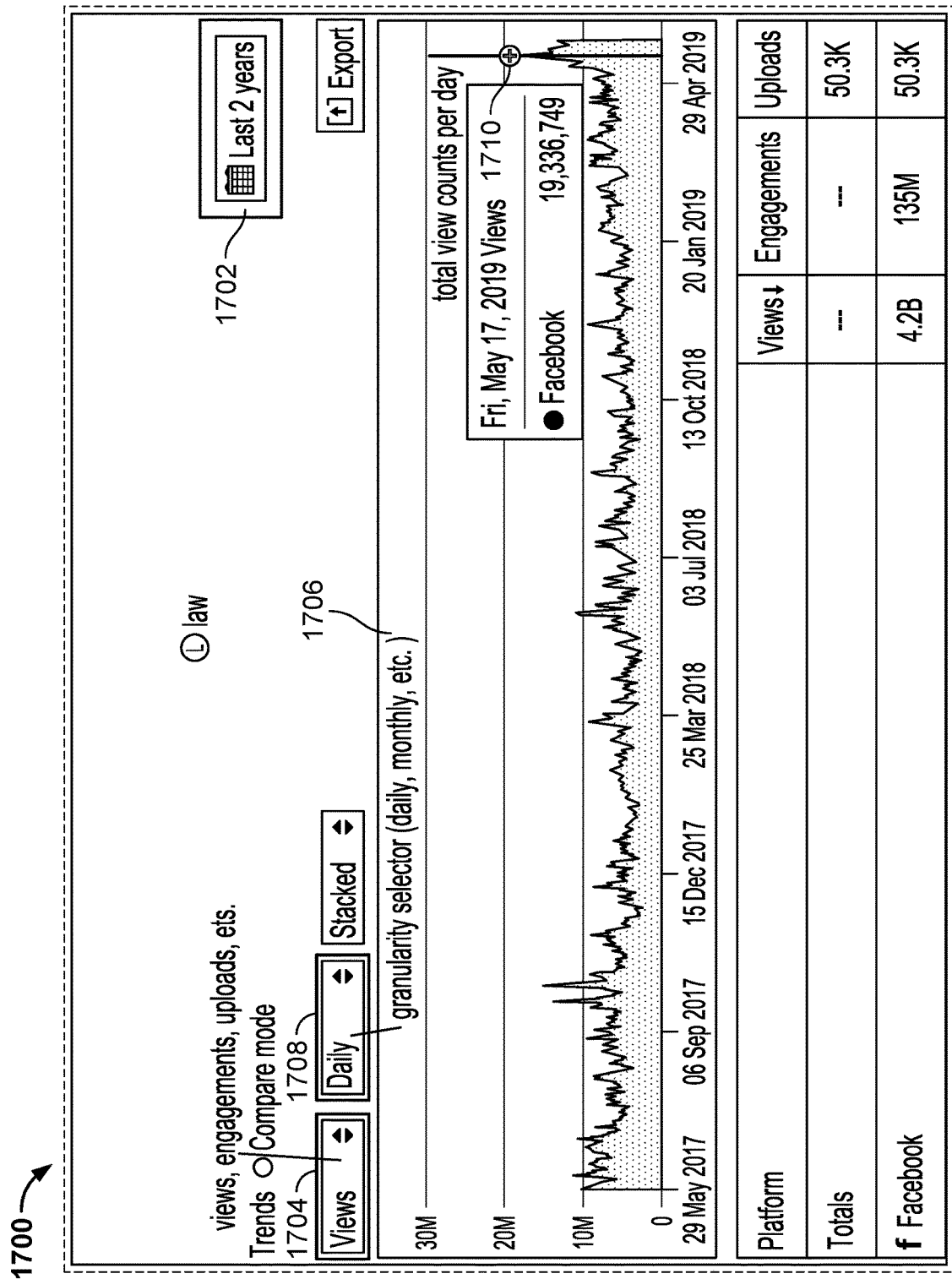
FIG. 17 is a diagram showing an example of a user interface that presents a time series aggregation result in response to a search query.

FIG. 17 is a diagram showing an example of a user interface that presents a time series aggregation result in response to a search query. In the example of FIG. 17, user interface 1700 includes time series graph 1706 that shows the aggregation results that were generated in response to the search query that was input via user interface 1600 of FIG. 16. Time series graph 1706 shows the aggregated views per day across all videos on Facebook that matched the keyword "law" and that were uploaded within the last 365 days, are more than 15 seconds in length, are in English, and have been viewed at least 2,000 times since their respective upload dates. Time series graph 1706 spans May 29, 2017 through May 29, 2019. The span of time (2 years, as shown in FIG. 17) over which time series graph 1706 is generated can be modified by a user selecting historical time window element 1702. In response to a user modification to historical window of time element 1702, a new search query can be performed based on the modified historical window of time over which to perform the originally requested aggregation and a new graph can be presented at the user interface.

Additionally, a user can interact with statistical information type interactive element 1704 to select a different statistical information type other than "views" to aggregate for the search query. Furthermore, a user can interact with time interval interactive element 1708 to select a different time interval other than "daily" to aggregate for the search query. For example, other types of time intervals may include: weekly, monthly, quarterly, and yearly/annually. In response to a user modification to either statistical information type interactive element 1704 or time interval interactive element 1708, a new search query can be performed based on the modified search query and a new graph can be presented at the user interface.

Top videos interactive element 1710 on time series graph 1706 is associated with additional information corresponding to a particular day (Friday, May 17, 2019) within the two-year window of time that was covered by time series graph 1706. If a user selected top videos interactive element 1710 on time series graph 1706, in some embodiments, additional information corresponding to the videos that match the attributes of the search query (videos uploaded to the platform, Facebook, that match the keyword "law" and that were uploaded within the last 365 days, are more than 15 seconds in length, are in English, and have been viewed at least 2,000 times since their respective upload dates) can be presented for that particular day.

Figure 18:
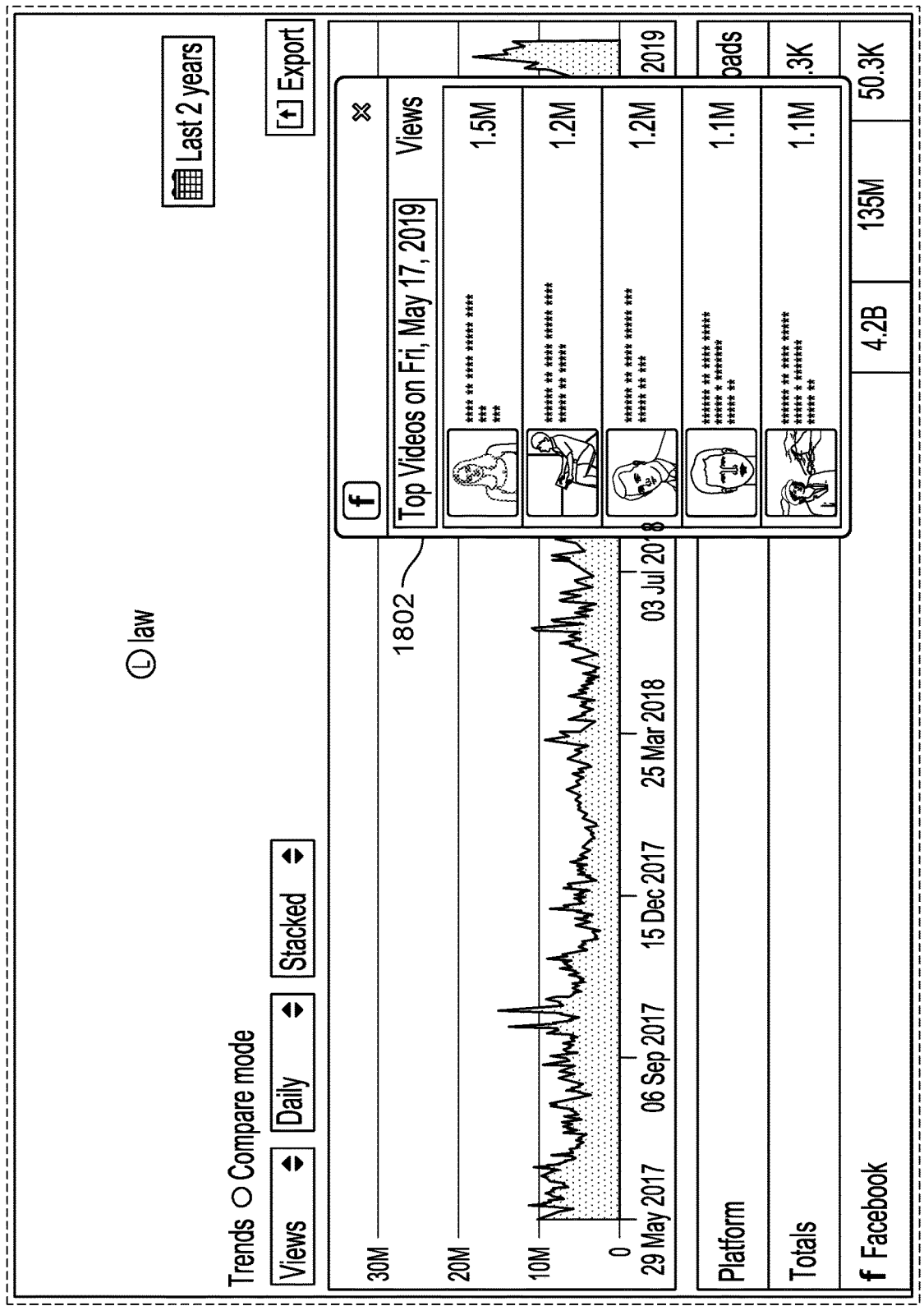
FIG. 18 is a diagram showing an example of a user interface that presents additional information in response to a user selection of a top videos interactive element with respect to a time series graph.

FIG. 18 is a diagram showing an example of a user interface that presents additional information in response to a user selection of a top videos interactive element with respect to a time series graph. List of videos 1802 is presented in response to a user selection of top videos interactive element 1710 of user interface 1700 of FIG. 17. In the example of FIG. 18, list of videos 1802 shows the five videos with the most number of views on May 17, 2019. In another example, a number of videos with the most number of views can be determined over a period of time that is greater than one day.

In yet another example, various embodiments of time series aggregation described herein can be used to create leaderboards of top performing items (e.g., videos) over any arbitrary search query and given time period. More specifically, the top thousand videos uploaded to a particular source platform that match a particular keyword, that were uploaded in a historical window of time (e.g., the last 365 days), that are more than 15 seconds in length, and that are in English can be ranked by various specified ranking metrics. Example ranking metrics include Q1 2019 views or the number of likes they get on Mondays during March (cumulative, so first Monday of March+second Monday of March+third Monday of the March+ . . . ).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
obtain a first entry value corresponding to an item, wherein the first entry value comprises a first recorded data point that is associated with a first time interval;
prior to generating a compressed block based in part on compressing the first entry value with at least a second entry value, the second entry value comprises a second recorded data point that is associated with a second time interval, wherein the first time interval and the second time interval are of the same length, sort the first recorded data point and the second recorded data point based on a reverse chronological order of the first time interval and the second time interval;
generate the compressed block based at least in part on compressing the first entry value with at least the second entry value;
store the compressed block in a document corresponding to the item;
determine that the item matches an aggregation search query;
decompress the compressed block from the document corresponding to the item to obtain the first entry value and the second entry value; and
generate an aggregation result in response to the aggregation search query based on at least a portion of the first entry value and the second entry value; and
a memory coupled to the processor and configured to provide the processor with instructions.

2. The system of claim 1, wherein the second entry value comprises a padded data point.

3. The system of claim 1, wherein to generate the compressed block comprises to:
determine whether at least one of the first entry value and the second entry value is a negative integer; and
in the event that the at least one of the first entry value and the second entry value comprises a negative integer, convert each of the first entry value and the second entry value to respective new positive values based on a mapping scheme.

4. The system of claim 1, wherein the processor is further configured to store, in the document corresponding to the item, a value representing a most recent time interval corresponding to a most recent data point in the compressed block.

5. The system of claim 1, wherein the processor is further configured to store, in the document corresponding to the item, a value representing a total number of data points included in the compressed block and one or more other compressed blocks, if any, in the document corresponding to the item.

6. The system of claim 1, wherein to generate the compressed block comprises to:
determine a maximum value in a plurality of data points, wherein the plurality of data points includes the first entry value and the second entry value;
determine a minimum number of bits that is to be used to represent the maximum value; and
generate a binary representation of each data point in the plurality of data points using the minimum number of bits.

7. The system of claim 1, wherein the document corresponding to the item is stored at a database server.

8. The system of claim 1, wherein to decompress the compressed block comprises to:
read at least a portion of the compressed block to determine a number of bits used to store each value of the compressed block; and
use the number of bits used to store each value of the compressed block to obtain the first entry value and the second entry value.

9. The system of claim 1, wherein the first time interval is included in a historical window of time associated with the aggregation search query and wherein to generate the aggregation result comprises to:

generate a first item-specific data structure corresponding to the item, wherein the first item-specific data structure includes the first recorded data point in a first element of the first item-specific data structure associated with the first time interval; and wherein to generate the aggregation result comprises to aggregate the first recorded data point in the first element associated with the first time interval to a corresponding data point in a first data element of a second item-specific data structure associated with the first time interval.

10. The system of claim 1, wherein the first time interval and the second time interval are included in a historical window of time associated with the aggregation search query and wherein to generate the aggregation result comprises to:

generate a first item-specific data structure corresponding to the item, wherein the first item-specific data structure includes the first recorded data point in a first element of the first item-specific data structure associated with the first time interval and the second recorded data point in a second element of the first item-specific data structure associated with the second time interval; and wherein to generate the aggregation result comprises to aggregate the first recorded data point with at least the second recorded data point.

11. The system of claim 1, wherein the processor is further configured to present a visualization determined based on the aggregation result at a user interface.

12. The system of claim 1, wherein the processor is further configured to:

receive the aggregation search query, wherein the aggregation search query includes at least one or more attributes, an aggregation type, or a historical window of time; and determine a matching set of documents corresponding to a set of items that match the aggregation search query.

13. A method, comprising:

obtaining a first entry value corresponding to an item, wherein the first entry value comprises a first recorded data point that is associated with a first time interval;

prior to generating a compressed block based at in part on compressing the first entry value with at least a second entry value, the second entry value comprises a second recorded data point that is associated with a second time interval, wherein the first time interval and the second time interval are of the same length, sorting the first recorded data point and the second recorded data point based on a reverse chronological order of the first time interval the second time interval;

generating the compressed block based at least in part on compressing the first entry value with at least the second entry value;

storing the compressed block in a document corresponding to the item;

determining that the item matches an aggregation search query;

decompressing the compressed block from the document corresponding to the item to obtain the first entry value and the second entry value; and generating an aggregation result in response to the aggregation search query based on at least a portion of the first entry value and the second entry value.

14. The method of claim 13, further comprising storing, in the document corresponding to the item, a value representing a most recent time interval corresponding to a most recent data point in the compressed block.

15. The method of claim 13, further comprising storing, in the document corresponding to the item, a value representing a total number of data points included in the compressed block and one or more other compressed blocks, if any, in the document corresponding to the item.

16. The method of claim 13, wherein the first time interval is included in a historical window of time associated with the aggregation search query and wherein generating the aggregation result comprises:

generating a first item-specific data structure corresponding to the item, wherein the first item-specific data structure includes the first recorded data point in a first element of the first item-specific data structure associated with the first time interval; and wherein generating the aggregation result comprises aggregating the first recorded data point in the first element associated with the first time interval to a corresponding data point in a first data element of a second item-specific data structure associated with the first time interval.

17. The method of claim 13, wherein the first time interval and the second time interval are included in a historical window of time associated with the aggregation search query and wherein generating the aggregation result comprises:

generating a first item-specific data structure corresponding to the item, wherein the first item-specific data structure includes the first recorded data point in a first element of the first item-specific data structure associated with the first time interval and the second recorded data point in a second element of the first item-specific data structure associated with the second time interval; and wherein generating the aggregation result comprises aggregating the first recorded data point with at least the second recorded data point.

18. A system, comprising:

a processor configured to:

obtain a first entry value corresponding to an item, wherein the first entry value comprises a first recorded data point that is associated with a first time interval;

generate a compressed block based at least in part on compressing the first entry value with at least a second entry value, wherein to generate the compressed block comprises to:

determine a maximum value in a plurality of data points, wherein the plurality of data points includes the first entry value and the second entry value;

determine a minimum number of bits that is to be used to represent the maximum value; and generate a binary representation of each data point in the plurality of data points using the minimum number of bits;

store the compressed block in a document corresponding to the item;

determine that the item matches an aggregation search query;

decompress the compressed block from the document corresponding to the item to obtain the first entry value and the second entry value; and generate an aggregation result in response to the aggregation search query based on at least a portion of the first entry value and the second entry value; and a memory coupled to the processor and configured to provide the processor with instructions.

19. A system, comprising:
a processor configured to:
- obtain a first entry value corresponding to an item, wherein the first entry value comprises a first recorded data point that is associated with a first time interval;
- generate a compressed block based at least in part on compressing the first entry value with at least a second entry value;
- store the compressed block in a document corresponding to the item;
- determine that the item matches an aggregation search query;
- decompress the compressed block from the document corresponding to the item to obtain the first entry value and the second entry value, wherein to decompress the compressed block comprises to:
  - read at least a portion of the compressed block to determine a number of bits used to store each value of the compressed block; and
  - use the number of bits used to store each value of the compressed block to obtain the first entry value and the second entry value; and
- generate an aggregation result in response to the aggregation search query based on at least a portion of the first entry value and the second entry value; and a memory coupled to the processor and configured to provide the processor with instructions.

20. A method, comprising:
- obtaining a first entry value corresponding to an item, wherein the first entry value comprises a first recorded data point that is associated with a first time interval;
- generating a compressed block based at least in part on compressing the first entry value with at least a second entry value, wherein generating the compressed block comprises:
  - determining a maximum value in a plurality of data points, wherein the plurality of data points includes the first entry value and the second entry value;
  - determining a minimum number of bits that is to be used to represent the maximum value; and
  - generating a binary representation of each data point in the plurality of data points using the minimum number of bits;
- storing the compressed block in a document corresponding to the item;
- determining that the item matches an aggregation search query;
- decompressing the compressed block from the document corresponding to the item to obtain the first entry value and the second entry value; and
- generating an aggregation result in response to the aggregation search query based on at least a portion of the first entry value and the second entry value.

21. A method, comprising:
- obtaining a first entry value corresponding to an item, wherein the first entry value comprises a first recorded data point that is associated with a first time interval;
- generating a compressed block based at least in part on compressing the first entry value with at least a second entry value;
- storing the compressed block in a document corresponding to the item;
- determining that the item matches an aggregation search query;
- decompressing the compressed block from the document corresponding to the item to obtain the first entry value and the second entry value, wherein decompressing the compressed block comprises:
  - reading at least a portion of the compressed block to determine a number of bits used to store each value of the compressed block; and
  - using the number of bits used to store each value of the compressed block to obtain the first entry value and the second entry value; and
- generating an aggregation result in response to the aggregation search query based on at least a portion of the first entry value and the second entry value.

* * * * *